(12) United States Patent
Kaneko et al.

(10) Patent No.: US 8,837,913 B2
(45) Date of Patent: Sep. 16, 2014

(54) RECORDING DEVICE AND DUBBING METHOD

(75) Inventors: Yuki Kaneko, Inagi (JP); Masahiko Okamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 13/453,575

(22) Filed: Apr. 23, 2012

(65) Prior Publication Data

US 2013/0004144 A1    Jan. 3, 2013

(30) Foreign Application Priority Data

Jun. 28, 2011   (JP) ................................. 2011-143432

(51) Int. Cl.
| | | |
|---|---|---|
| *G11B 27/00* | (2006.01) |
| *H04N 5/765* | (2006.01) |
| *G11B 27/10* | (2006.01) |
| *H04N 21/436* | (2011.01) |
| *G11B 27/34* | (2006.01) |
| *H04N 21/4147* | (2011.01) |
| *G11B 20/10* | (2006.01) |

(52) U.S. Cl.
CPC ...... H04N 5/765 (2013.01); *G11B 2020/10972* (2013.01); *G11B 2020/10833* (2013.01); G11B 20/10 (2013.01); G11B 27/105 (2013.01); H04N 21/43622 (2013.01); G11B 27/34 (2013.01); H04N 21/4147 (2013.01)
USPC ........... 386/279; 386/360; 369/47.12; 369/84

(58) Field of Classification Search
CPC .......................... G11B 2226/90; G11B 27/034
USPC .......................... 386/279, 360; 369/47.12, 84
See application file for complete search history.

(56) References Cited

U.S. PATENT DOCUMENTS

| | | | | |
|---|---|---|---|---|
| 2007/0245048 A1 * | 10/2007 | Mesut et al. | .................. | 710/105 |
| 2008/0025690 A1 | 1/2008 | Kondo et al. | | |
| 2009/0067808 A1 * | 3/2009 | Fushimi et al. | ................. | 386/54 |

FOREIGN PATENT DOCUMENTS

| | | |
|---|---|---|
| JP | 2007-221508 A | 8/2007 |
| JP | 2009-140425 A | 6/2009 |
| JP | 2010-263532 A | 11/2010 |
| WO | WO 2006-033224 A1 | 3/2006 |

* cited by examiner

*Primary Examiner* — Hung Dang
*Assistant Examiner* — Mishawn Dunn
(74) *Attorney, Agent, or Firm* — Knobbe Martens Olson & Bear LLP

(57) ABSTRACT

According to one embodiment, a copying method including, deriving a first time requested by a process in a first transmission device that interrupts transmission to a copying destination device to transmit a copying object to the copying destination device, detecting a second transmission device that transmits the same copying object to the copying destination device during the process that interrupts transmission to the copying destination device following after interruption point and deriving second time in which the detected device transmits the copying object to the copying destination device, deriving third time in which the copying destination device is set in a non-reception state for the copying object.

17 Claims, 25 Drawing Sheets

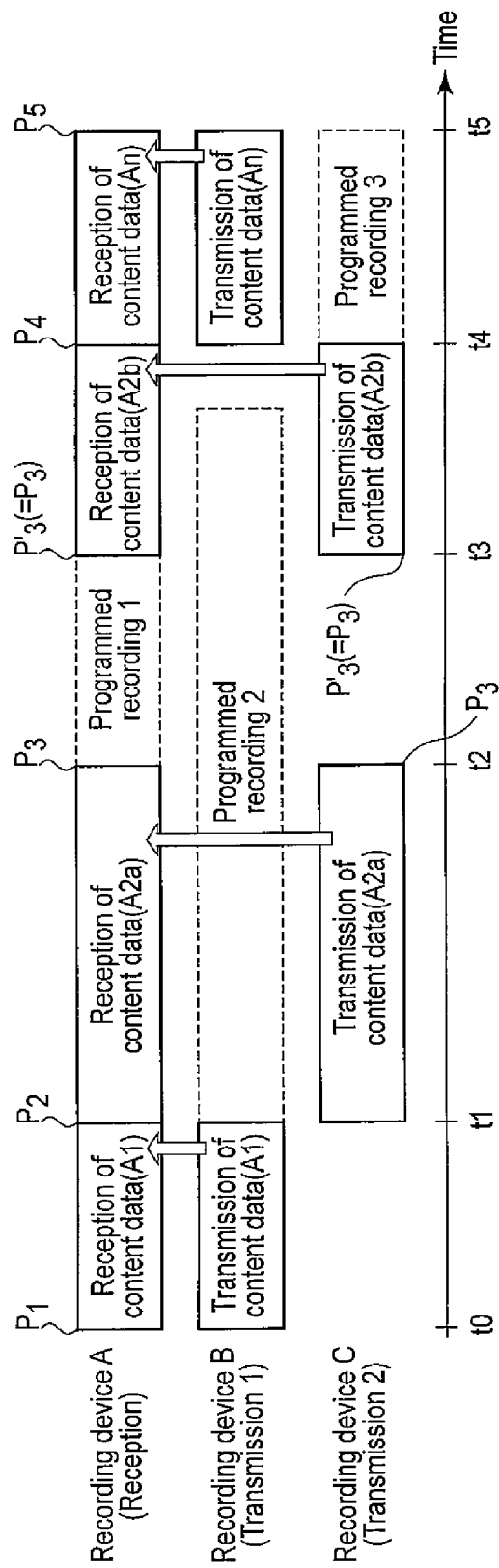
F I G. 2A

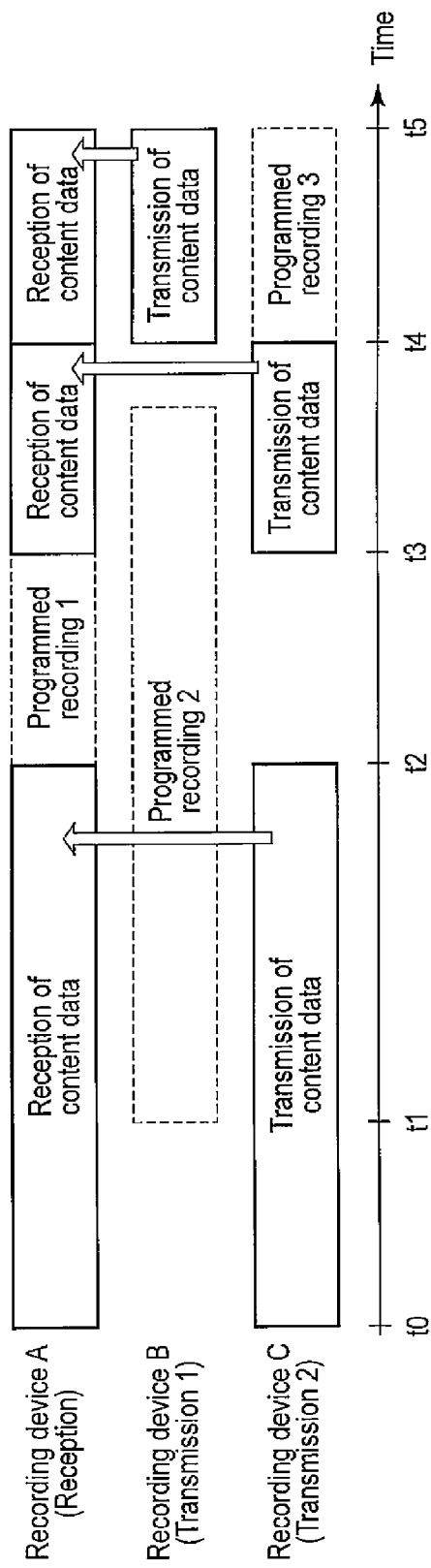
F I G. 2B

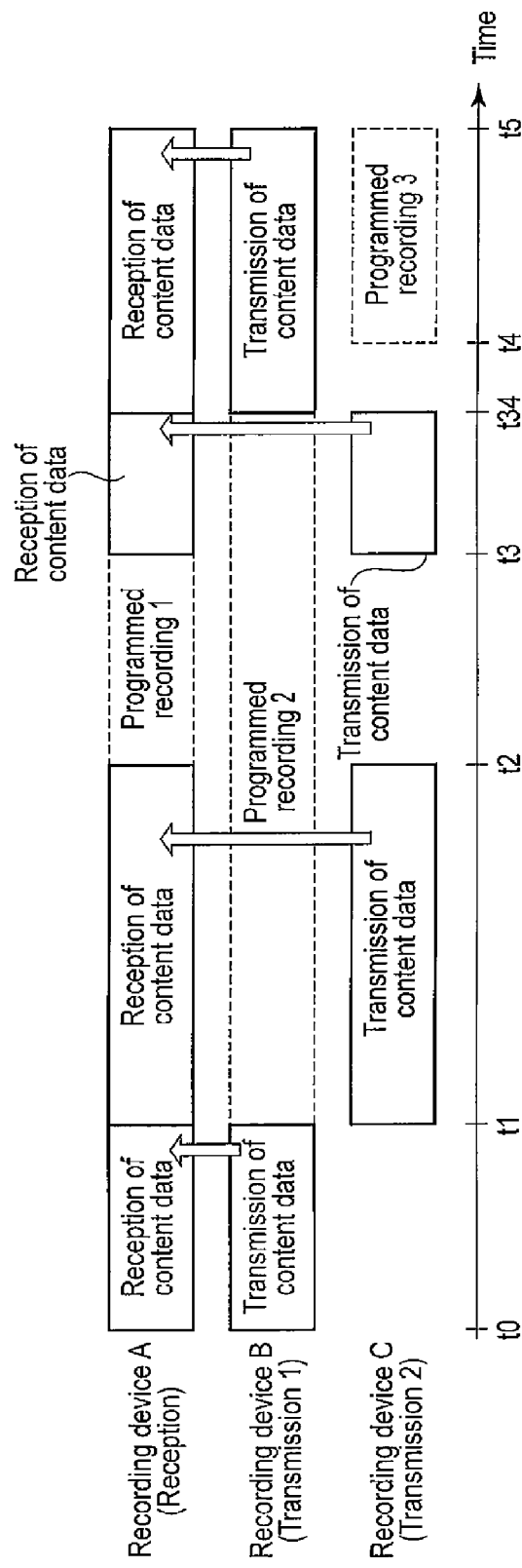
F I G. 2C

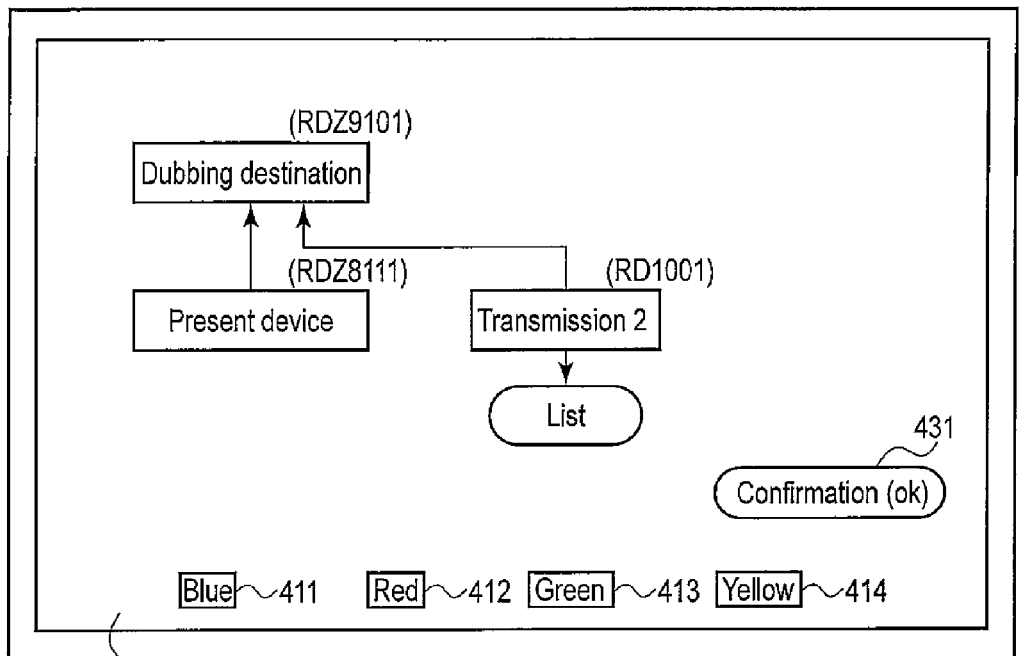
F I G. 4C
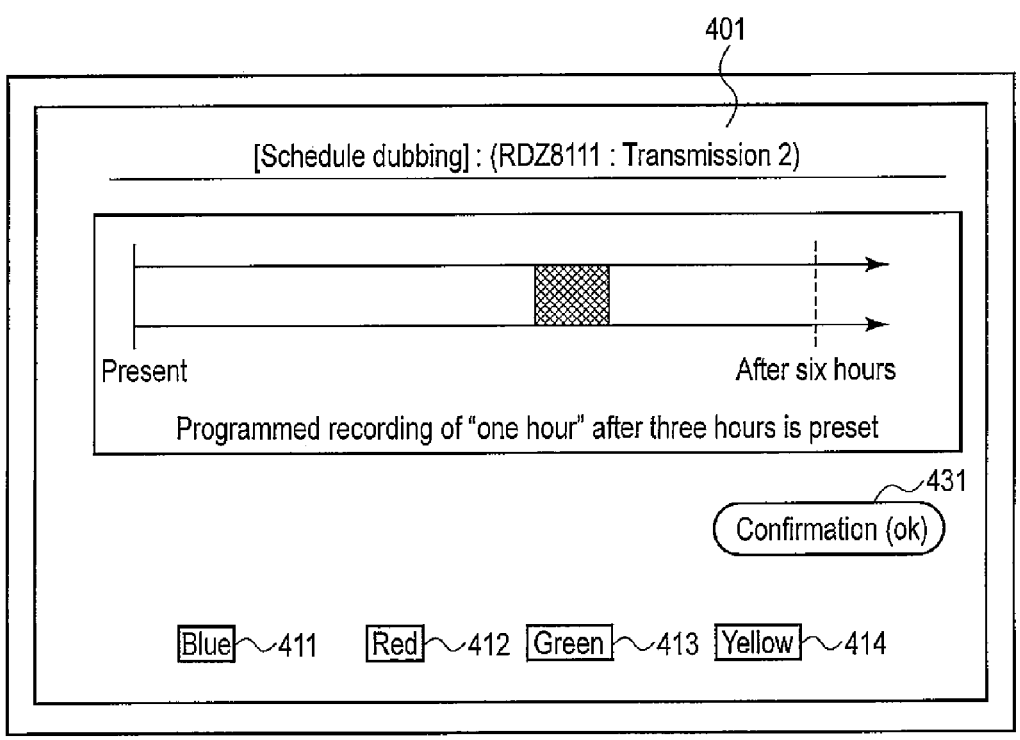
F I G. 4D

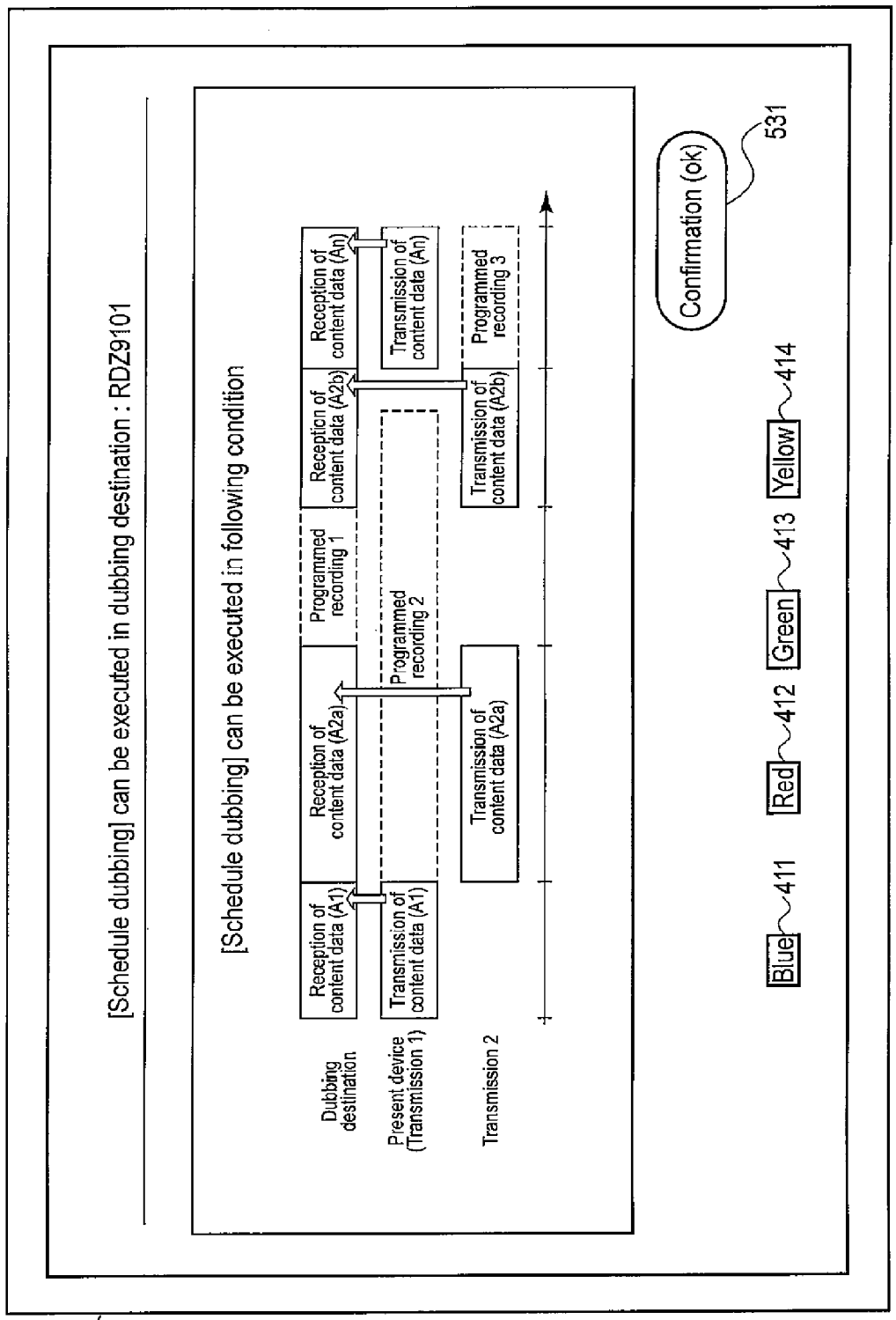
F I G. 5

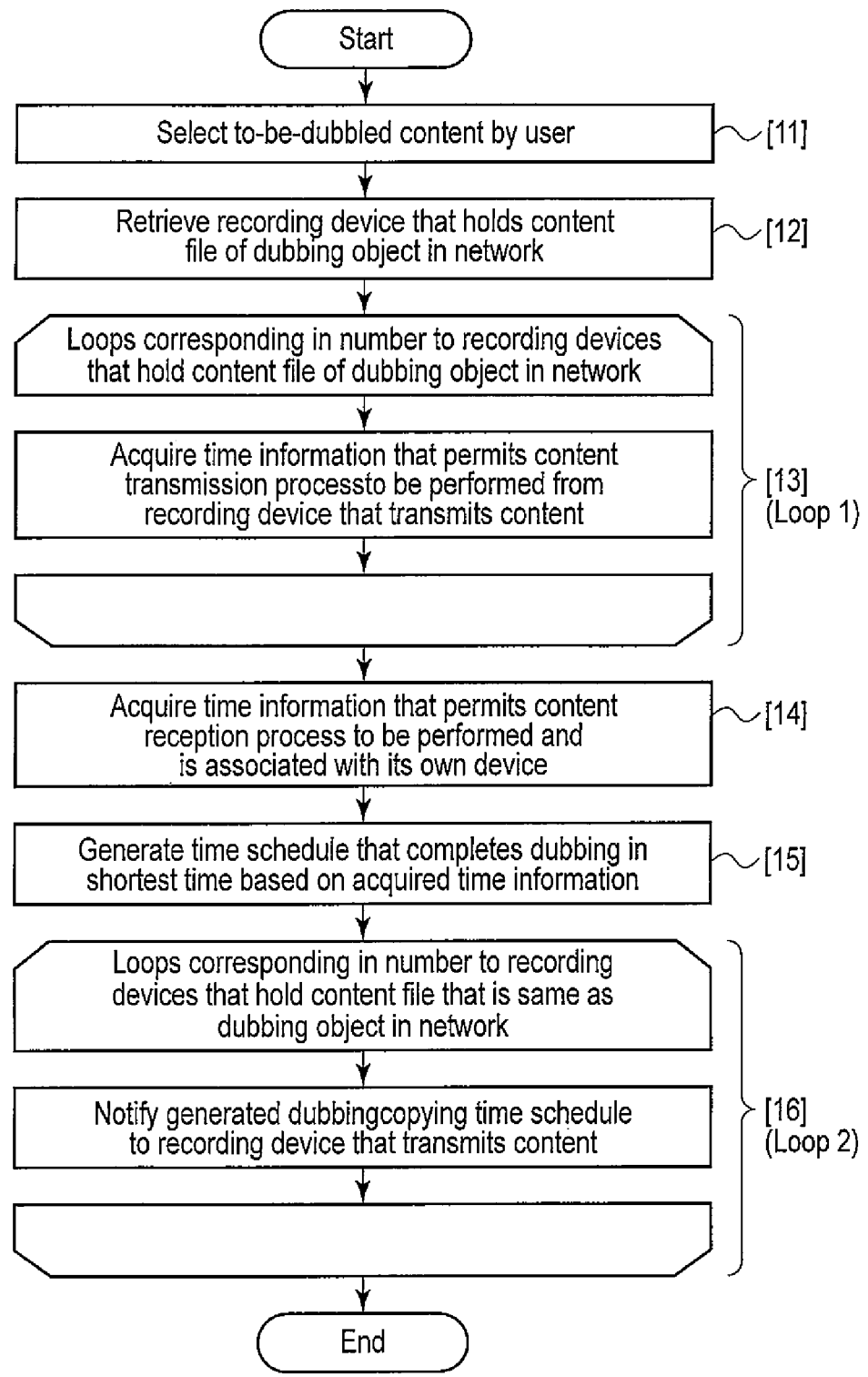
F I G. 7

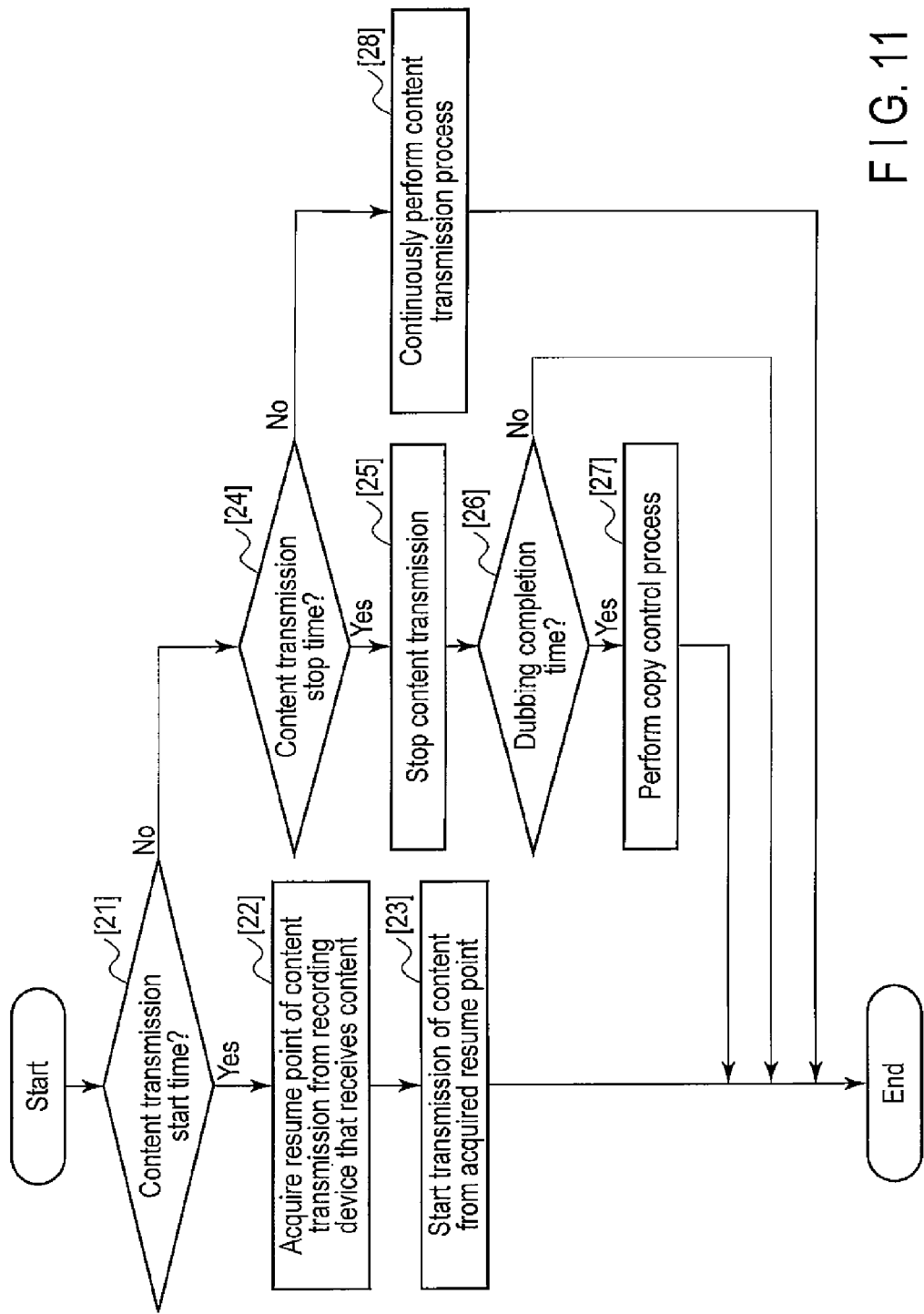
F I G. 11

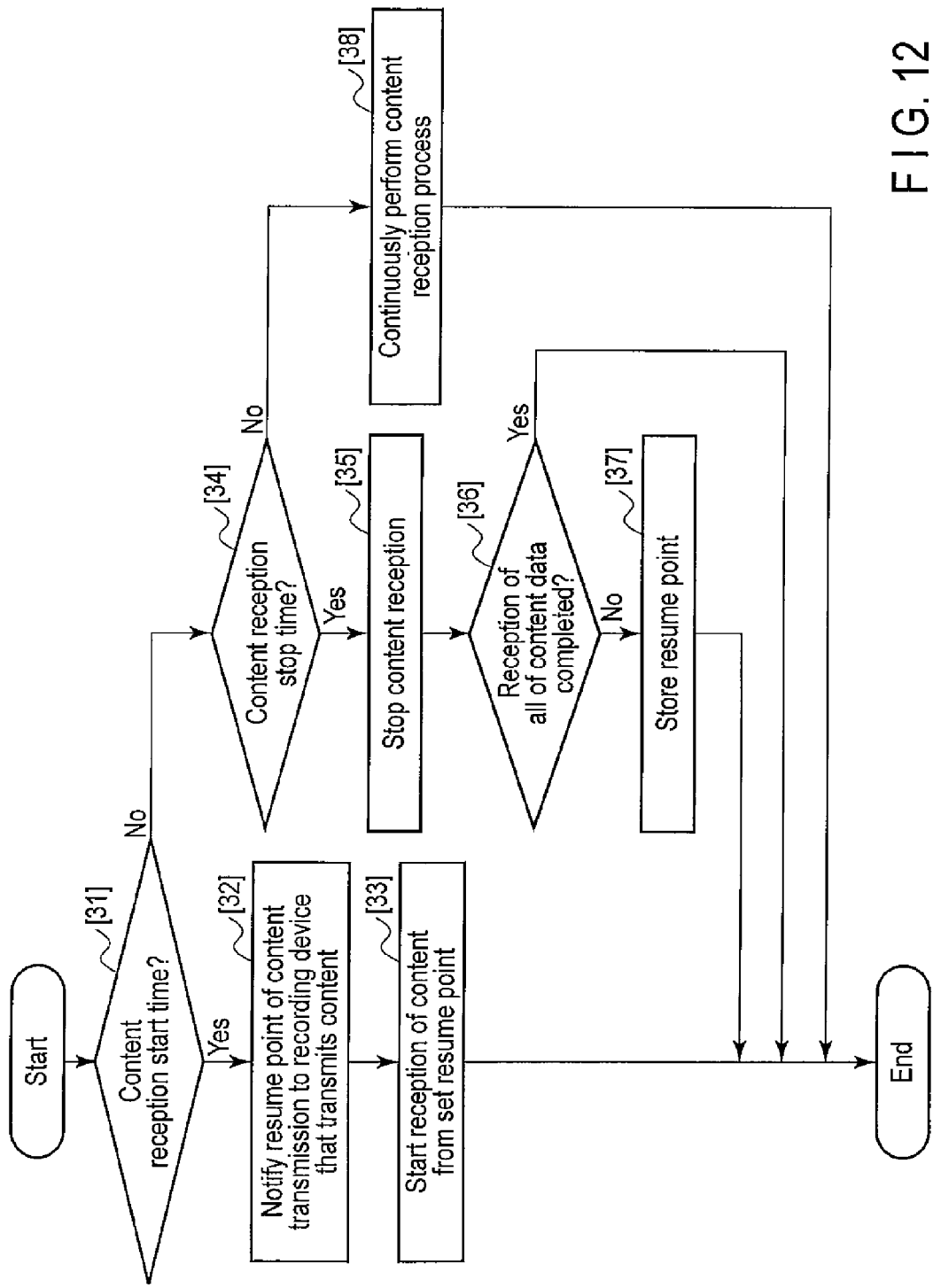
F I G. 12

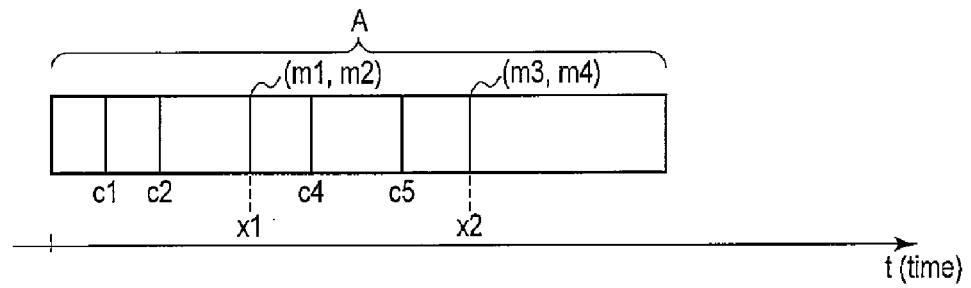
F I G. 14A
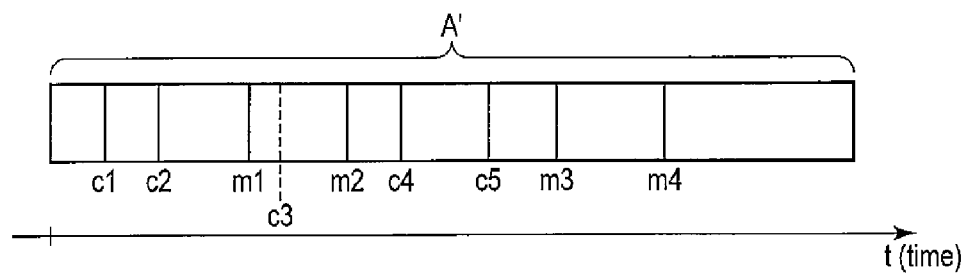
F I G. 14B
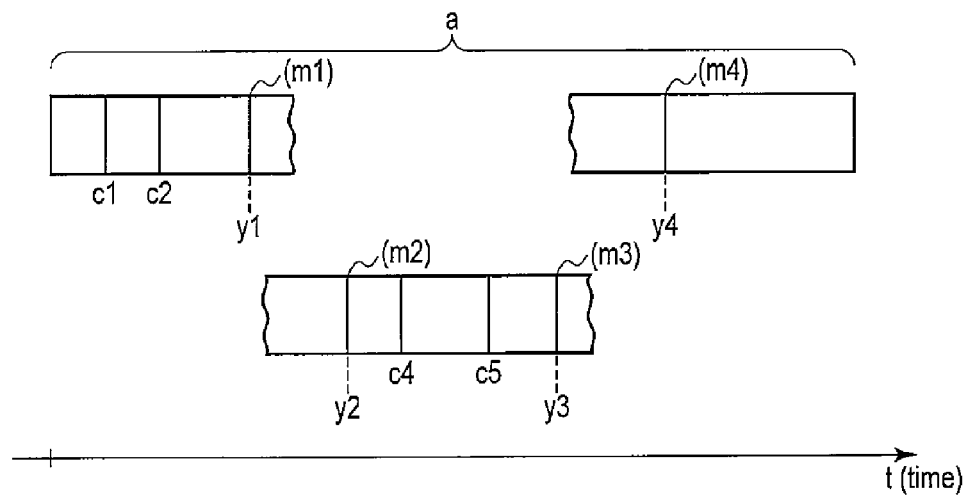
F I G. 14C

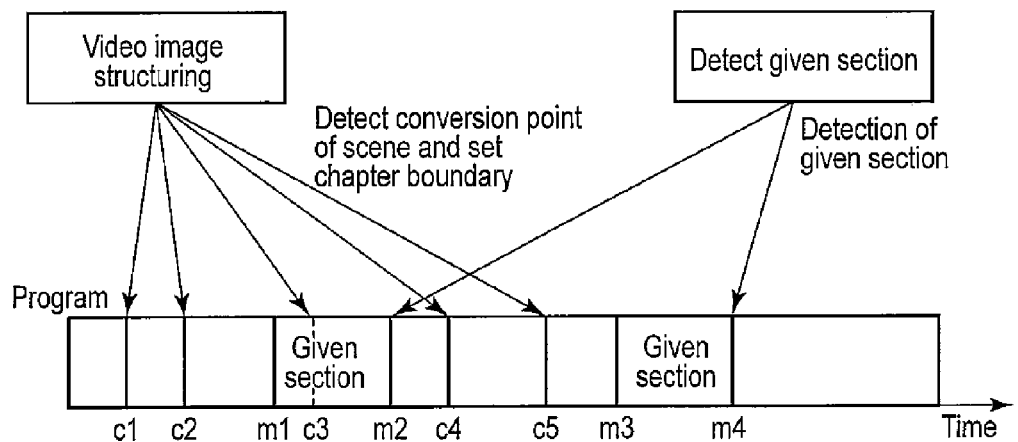
F I G. 15
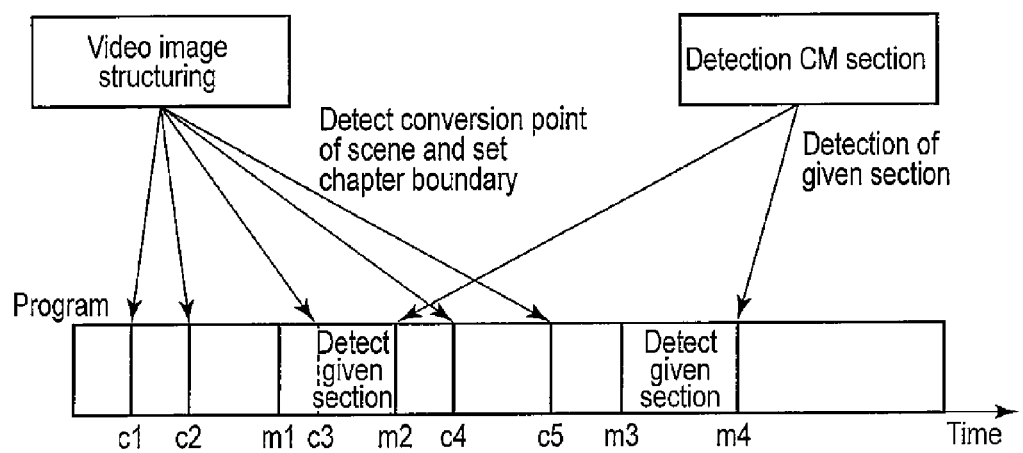
F I G. 16

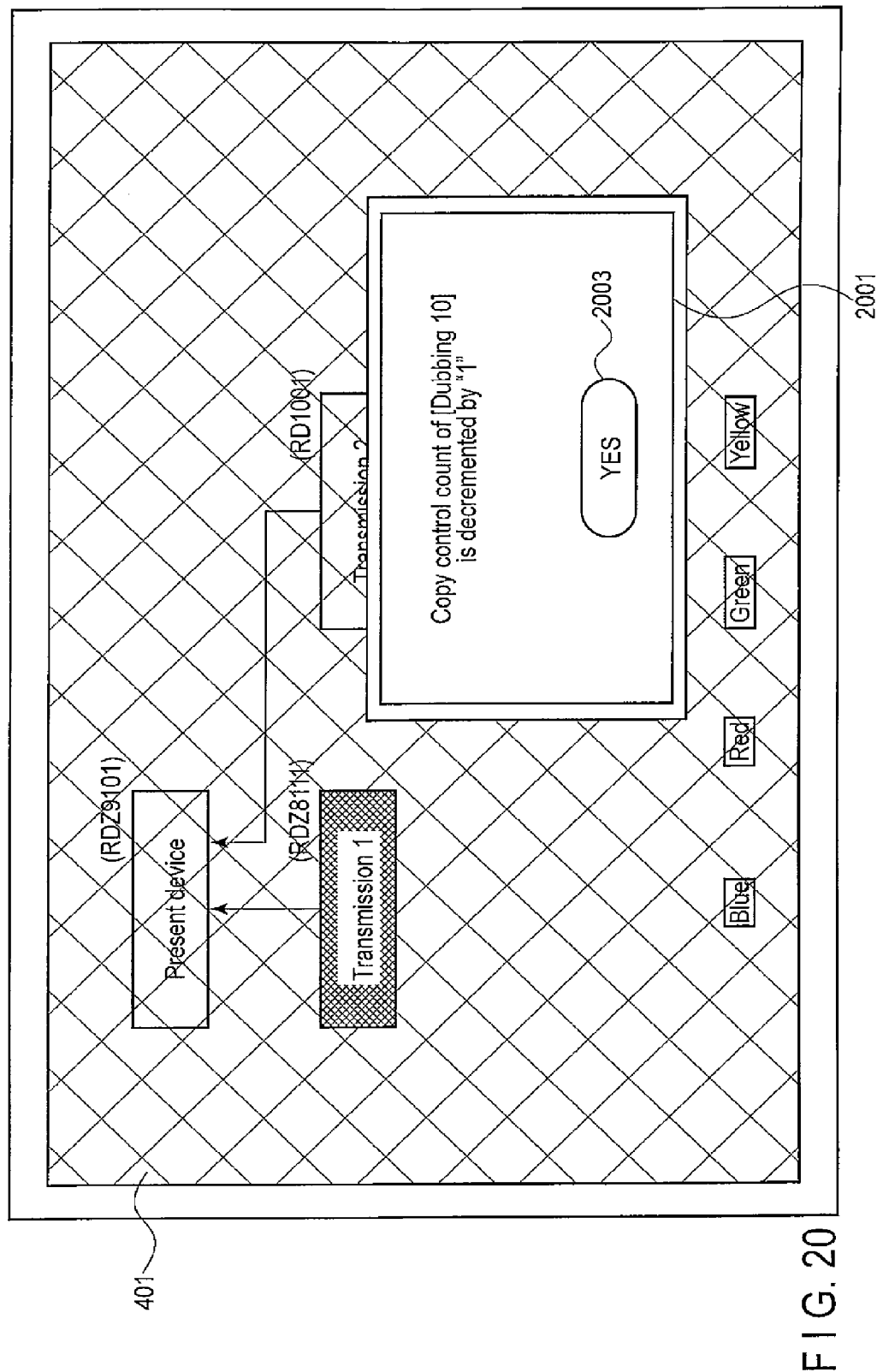
F I G. 20

RECORDING DEVICE AND DUBBING METHOD

CROSS-REFERENCE TO RELATED APPLICATIONS

This application is based upon and claims the benefit of priority from prior Japanese Patent Application No. 2011-143432, filed Jun. 28, 2011, the entire contents of which are incorporated herein by reference.

FIELD

Embodiments described herein relate generally to a recording device and dubbing method.

BACKGROUND

A recording device that can perform a parallel process of recording (writing) and copying at the time of copying (dubbing) of recorded content (programs) is not almost widely used except a case for part of the special application.

In popularly used recording devices, a copying process is started after recording is terminated so as not to give an influence on recording (programmed recording) that is programmed to be executed during copying when copying is instructed.

Since the instructed copying process is not performed until recording programmed to be executed is terminated, a time required for terminating the copying process becomes long.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 2A, 2B and 2C are exemplary diagrams each showing an example of the outline of a recording method, according to an embodiment;

FIGS. 4A, 4B, 4C, 4D, 4E and 4F are exemplary diagrams each showing an example of a recording method and showing screen displays when recording is controlled on the transmission side, according to an embodiment;

FIG. 5 is an exemplary diagram showing an example of a recording method showing a screen display when recording is controlled on the transmission side, according to an embodiment;

FIG. 7 is an exemplary diagram showing an example of a recording method and showing a screen display when recording is controlled on the transmission side, according to an embodiment;

FIG. 11 is an exemplary diagram showing an example of a recording method and showing a resume function when recording is controlled on the transmission side, according to an embodiment;

FIG. 12 is an exemplary diagram showing an example of a recording method and showing a resume function when recording is controlled on the reception side, according to an embodiment;

FIGS. 14A, 14B and 14C are exemplary diagrams each showing an example of a recording method and showing method of comparison of dividing positions of divided content with content before division of content divided based on the resume function, according to an embodiment;

FIG. 15 is an exemplary diagram showing an example of a recording method and showing a process of structuring a video image for applying the resume function, according to an embodiment;

FIG. 16 is an exemplary diagram showing an example of a recording method and showing a process for detecting a given section for applying the resume function, according to an embodiment;

FIG. 20 is an exemplary diagram showing an example of an outline of a "copy control process" in a recording method, according to an embodiment.

DETAILED DESCRIPTION

Various embodiments will be described hereinafter with reference to the accompanying drawings. In general, according to one embodiment, a copying method comprising: deriving a first time requested by a process in a first transmission device that interrupts transmission to a copying destination device to transmit a copying object to the copying destination device; detecting a second transmission device that transmits the same copying object to the copying destination device during the process that interrupts transmission to the copying destination device following after an interruption point and deriving a second time in which the detected device transmits the copying object to the copying destination device; deriving a third time in which the copying destination device is set in a non-reception state for the copying object; and setting a transmission condition for transmitting the copying object to the copying destination device according to the first, second and third times.

Embodiments will now be described hereinafter in detail with reference to the accompanying drawings.

Figure 1:
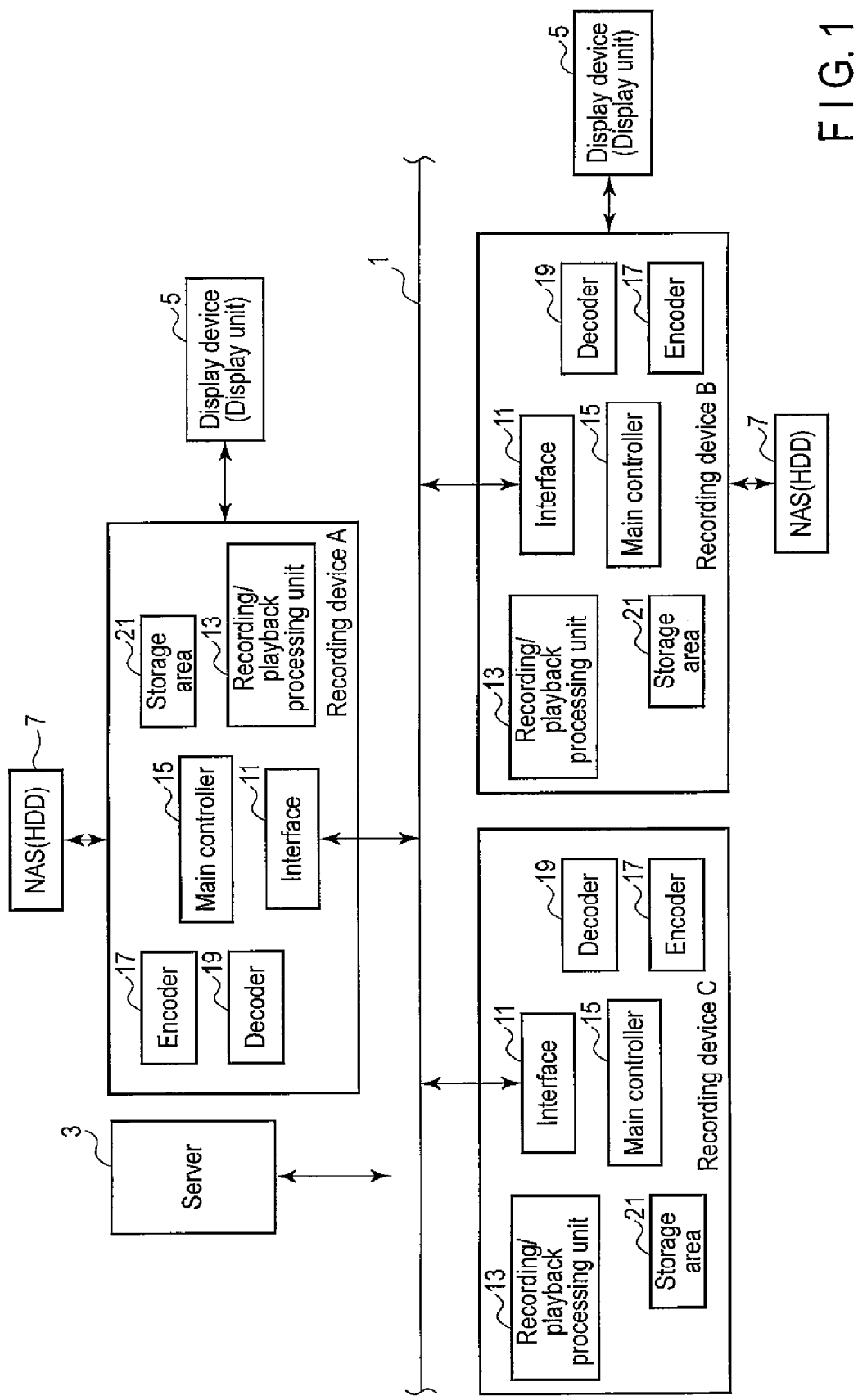
FIG. 1 is an exemplary diagram showing an example in which two or more recording devices are connected, according to an embodiment.

FIG. 1 shows an example in which two or more recording devices according to an embodiment are connected. For example, each of the recording devices may be a personal computer (PC) or a television receiver having a recording device integrally provided therein. Further, each element/configuration explained below may be realized based on hardware or realized based on software by means of a microcomputer (processing device, CPU) or the like.

The connection (mutual recording system) including two or more recording devices shown in FIG. 1 includes at least one recording-side recording device A and at least one supply-side recording device B. In FIG. 1, a case wherein supply-side recording device C (second supply-side recording device) is included is explained. In this case, recording devices A, B, C may have substantially the same configuration and, for example, supply-side recording device B or C may be used as a recording-side recording device or recording-side recording device A may be used as a supply-side recording device. Each recording device is not dominated by the name of a recording device and can perform a playback process for recorded information (content/program/title).

Further, at least one of the recording devices may be a device that mainly holds data like a network attached storage (NAS) hard disk drive (HDD) 7 or the like. Alternatively, it may be a terminal device having a reception unit (tuner unit), encoder/decoder or the like prepared on the HDD. Further, the mutual recording system may be a multi-functional electronic device or the like in which a mobile recording device, a user interface unit for the recording device, for example, a touch panel, keyboard and the like and a communication function are integrally provided. Further, the given recording device can be provided together with a display device (monitor/display) prepared, for example, on the external portion or a display unit 5 integrally prepared and a GUI or the like that is explained later is visually displayed for direct visual observation (or viewable) by the user when the display device or display unit is provided. Further, for example, the given recording device may be integrally prepared together with a rack (storage shelf) that stores or holds a television receiver for receiving a television broadcast or the like and playing back the content thereof or an audio device that integrally has a speaker and amplifier.

For example, respective recording devices A, B, C are mutually connected via a network (local area network [LAN]) in which a mutual connection is assumed mainly in a home or small-scale establishment) 1 configured according to rules defined in the Digital Living Network Alliance (DLNA) standard. A server (home server) 3 that holds information (content/program/title) may be connected to the LAN 1. Further, for example, each recording device may be directly connected to the server 3 without using the LAN 1 by using an High-definition Digital Multimedia Interface (HDMI) cable or LAN cable (communication line) or a combination thereof. For example, transfer of information between the mutual recording devices may be a radio system (transmission or reception of information via a router of a wireless system). When the server 3 is connected, it can be used as a database referred at the time of copying of information explained later.

For example, the individual recording devices have storage areas (storage units) *21 ("*" indicates an identification code (A, B, C) of each device) represented by a hard disk drive (HDD) or Secure Digital (SD) memory and can record digital information (content/program/title) encoded according to a preset standard. Examples of the standards of recordable (treatable) digital information are, for video (moving pictures), Moving Picture Experts Group (MPEG) 1, MPEG-2, and MPEG-4 (H.264/AVC); for audio (speech/music), MPEG Audio Layer 3 (MP3), Audio Code 3 (AC3), and linear pulse code modulation (PCM); and, for stills (still pictures), Joint Photographic Experts Group (JPEG) and the like. The storage area *21 may be used as a database referred to at the copying (dubbing) time of information explained layer. Further, the database referred to at the copying (dubbing) time of the information can be prepared as firmwafe of a main controller 15 or built-in memory.

The each of the recording devices each include at least an interface unit *11 that inputs and outputs information transferred between the recording devices, a recording/playback processor *13 that writes (record) information to the storage area *21 and reads (plays back) information from the storage area and a main controller *15 that writes information to the recording/playback processor *13, plays back information from the recording/playback processor and controls the respective elements/configurations explained below. Further, each recording device at least includes an encoder *17 for recording information and a decoder *19 for playing back information.

When each (given) recording device has a function of receiving a television broadcast, a program (content/title/information) that is received by a reception unit (not shown) and selected by a tuner unit (not shown) is encoded by the encoder *17 and recorded on the storage unit *21 via the recording/playback processor *13. Further, for example, this is true for analog information (content/program/title) input as external input.

When playback of information (content/program/title) is instructed, information read from the storage unit *21 by means of the recording/playback processor *13 is decoded by the decoder *19 and output to an output unit (not shown) as video image output (video or still image) and Audio (speech/music) output. If a monitor device (display) and speaker are prepared, an output video image and speech (speech/music) are played back, also.

FIG. 2A shows an example of transfer (time schedule) of information at the copying (dubbing) time of information when a connection (mutual recording system) including the two or more recording devices shown in FIG. 1 is used. In this case, in the respective recording devices shown in FIG. 2A, recording device A is a reception-side (recording-side) device (a device that receives information) and recording devices B and C are transmission-side (supply-side) devices (devices that supply information). In this example, recording device A stores or copies (dubs) the same information (data (A1, A2, . . . , An-1, An at the dividing time (n is an integral number) of content item A) as that held by recording devices B and C in the storage area A21 (of its own device). In this case, it is assumed that programmed recording (1, 2, 3) registered in its own device is included in a period (start time–end time) in which the time length (data amount, A1+A2+, . . . , +(An-1)+An) of information to be copied cannot be executed as one process. That is, it is assumed that programmed recording 1 is prepared in recording-side recording device A, programmed recording 2 that is partly overlapped with programmed recording 1 (registered in recording device A) is prepared in supply-side recording device B and programmed recording 3 that is partly overlapped with the time length of content data is prepared in supply-side recording device C.

In the example shown in FIG. 2A, information (data (A1) of content item A) held by recording device B is supplied to recording device A until programmed recording 2 registered in recording device B is started. That is, at a time to, copying (dubbing) is started with recording device A used as a recording-side recording device and recording device A receives information from recording device B till a time t1 at which programmed recording of recording device B is started. In other words, recording device A receives data (A1) of the whole data of content item A that ranges from start time position P1 to time position (dividing point) P2 from recording device B.

When a time t1 at which programmed recording of recording device B is started is reached, (supply of information from recording device B is interrupted and) information (data [front half A2a of A2] of content item A) held by recording device C is supplied to recording device A till a time t2 at which programmed recording 1 registered in recording device A is started. That is, recording device A receives data (A2a) ranging from time position P2 to P3 among the whole data of content item A from recording device C in a period from time t1 to t2. In this case, the time length of information (data (A2) of content item A) held by recording device C is the length (data amount) until programmed recording 3 registered in recording device C is started, that is, till a time t4. Therefore, the process for data of content item A interrupted to be copied at time t2 is continuously performed from a portion in which copying is interrupted at time t2 by use of the resume function (as will be described later).

Programmed recording 1 registered in recording device A is started when time t2 is reached. Therefore, copying of information (data of content item A) is temporarily interrupted till a time t3 at which programmed recording 1 registered in recording device A is ended. After this, information (following after information divided at time t2) held by recording device C till time t4, that is, data A2b is supplied to recording device A and recording device A receives data (A2b) ranging from time position P3 (that is, the same time position as dividing point P3) of content item A to P4.

Next, information (An) is supplied till a time t5 from recording device B (in which programmed recording 2 in its own device is already ended) to recording device A and recording device A receives data (A3) ranging from time position P4 to end time position P5 among the whole data of content item A.

According to the above schedule, recording device A (recording side) completes copying of the whole data of content item A, that is, to-be-copied information (A1, A2, . . . , An-1, An).

As shown in FIG. 2B, information (data of content item A) held by recording device C can be supplied to recording device A till time t4 at which programmed recording 3 registered in recording device C is started (except a period in which programmed recording 1 of recording device A is executed) and information can be supplied from recording device B to recording device A in a period from time t4 to time t5.

Further, as shown in FIG. 2C, information (data of content item A) held by recording device C can be supplied to recording device A till a time t34 at which programmed recording 2 registered in recording device B is ended (except a period in which programmed recording 1 of recording device A is executed) and information can be supplied from recording device B to recording device A in a period from time t34 to time t5.

Since some devices in which preceding picture-recording (recording) is interrupted as a "picture-recording standby" state in a period of a few minute, e.g., 1 to 2 minutes of the programmed recording starting time are provided, it is preferable to advance (bring forward) the dividing point (a position [time] at which copying is interrupted by the resume function) by a time period defined as "recording standby". In this case, the possibility that the end of contents before division divided based on the resume function is unwantedly interrupted (lost) can be suppressed.

Further, the dividing point (a position [time] at which copying (dubbing) is interrupted by the resume function) can be set to precede the aforementioned "recording standby" and can be shifted into a "CM (commercial)" section included in a preset time (period). In this case, even if the end of content before division divided by use of the resume function and the head of the content after division are slightly deviated, a factor that the user finds disconcerting can be reduced.

A process for checking whether both content items are the same content and whether the content before and after division are a series of content at the time of comparison of division of content item A at time t2 shown in FIGS. 2A, 2B, 2C and a time of coupling of succeeding content item A (and the content of the content), that is, when a portion in which copying is interrupted at time t2 based on the resume function is supplied to recording device A again will be described later.

The operation of copying explained with reference to FIG. 2A is shown in FIG. 3, FIGS. 4A, 4B, 4C, 4D, 4E, 4F, FIG. 5 and FIG. 6.

Figure 3:
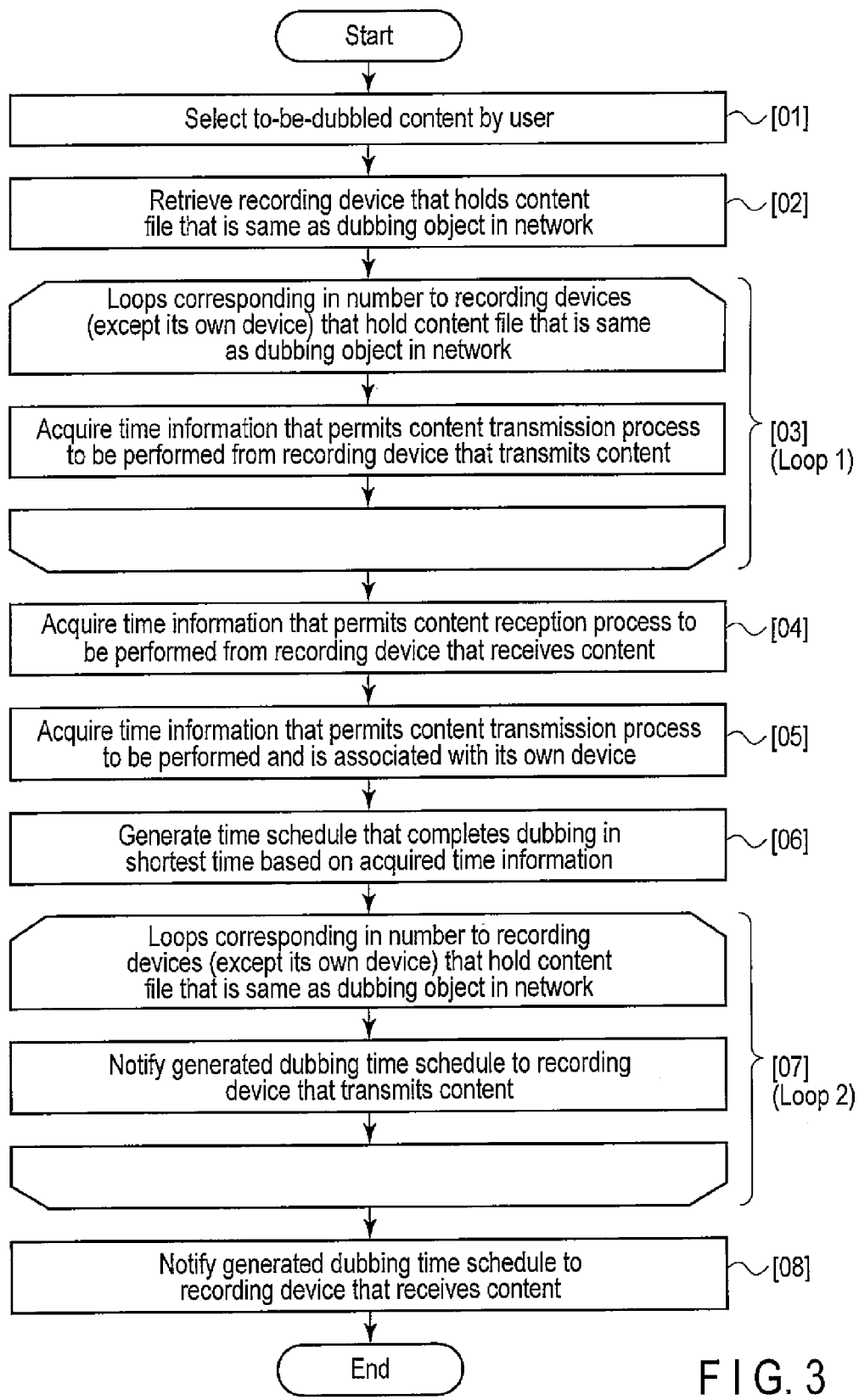
FIG. 3 is an exemplary diagram showing an example of a recording method when recording is controlled on the transmission side, according to an embodiment.

In FIG. 3, an example in which the recording device operated by the user is a supply-side (transmission-side) recording device is shown.

The user selects one or more to-be-copied content items on a graphical user interface (GUI) screen or the like by means of the supply-side (transmission-side) recording device (recording device B in FIG. 1) [01].

The number of other recording devices that hold (store) the same content (file) as the content to be copied in the network/mutual recording system (whether the supply-side (transmission-side) recording device other than recording-side (reception-side) recording device A is only B (its own device) or two including C when its own device, that is, a device used by the user to select the content is recording device B in the example shown in FIG. 1) is retrieved by causing the user to select the object content [02].

Next, all of the recording devices detected in [02] (except its own device, C [second recording device in the example of FIG. 1]) acquire time information that can be used for performing a transmission process (supply) of content item A with respect to recording-side (reception-side) recording device A <the loop operation is performed by the number of times corresponding to the number of devices except its own device> [03 (loop 1)].

Then, (device A) acquires time information that permits the reception process of content item A to be performed from the recording-side (reception-side) recording device (A) [04].

After this, time information that can be used for performing the transmission process of content item A is generated in its own device (B in the example of FIG. 1) [05].

Next, a "time schedule" as shown in FIGS. 2A, 2B, 2C is generated based on acquired time information (its own device and other devices) that can be used for performing the transmission process with respect to the recording-side (reception-side) recording device and time information that can be used for performing the reception process in the recording-side (reception-side) recording device (A) [06].

Subsequently, the aforementioned "time schedule" is notified to all of the recording devices detected in [02] (except its own device) [07 (loop 2)].

Then, the aforementioned "time schedule" is notified to the recording-side (reception-side) recording device [08].

As described above, a common time schedule is set in all of the recording devices in the network system and/or mutual recording system related to execution of copying (dubbing).

A GUI display example of a display (a display unit in a case where the monitor device/recording device is a television receiver) that displays video image output of the supply-side (transmission-side) recording device explained with reference to FIG. 3 is shown in FIGS. 4A to 4F, FIG. 5 and FIG. 6. If the recording device is a recorder device or HDD device, it becomes an output video signal that can be displayed by a monitor device (display) connected for video image output.

Figure 4A:
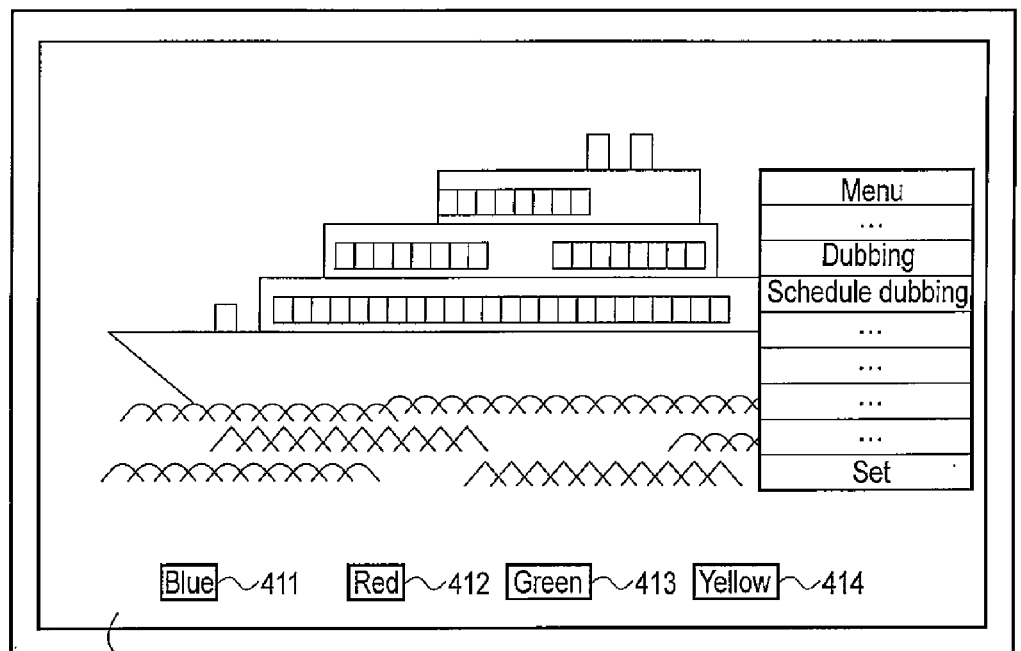

The user operates a remote control device (remote control terminal) and, for example, displays a "menu screen" 401 (FIG. 4A).

The "menu screen" 401 displays a plurality of menus that receive selection and decision instructions from the remote control device. If the recording device corresponds to terrestrial digital broadcasting, the "menu screen" 401 can receive instructions corresponding to four buttons including a "blue" button 411, "red" button 412, "green" button 413 and "yellow" button 414 of the remote control device and can give an exclusive processing name for acquiring a "time schedule" for the aforementioned copying as an instruction corresponding to any one of the buttons (refer to FIG. 5, it is hereinafter explained by use of an exclusive processing name of 'schedule dubbing'.

Figure 4B:
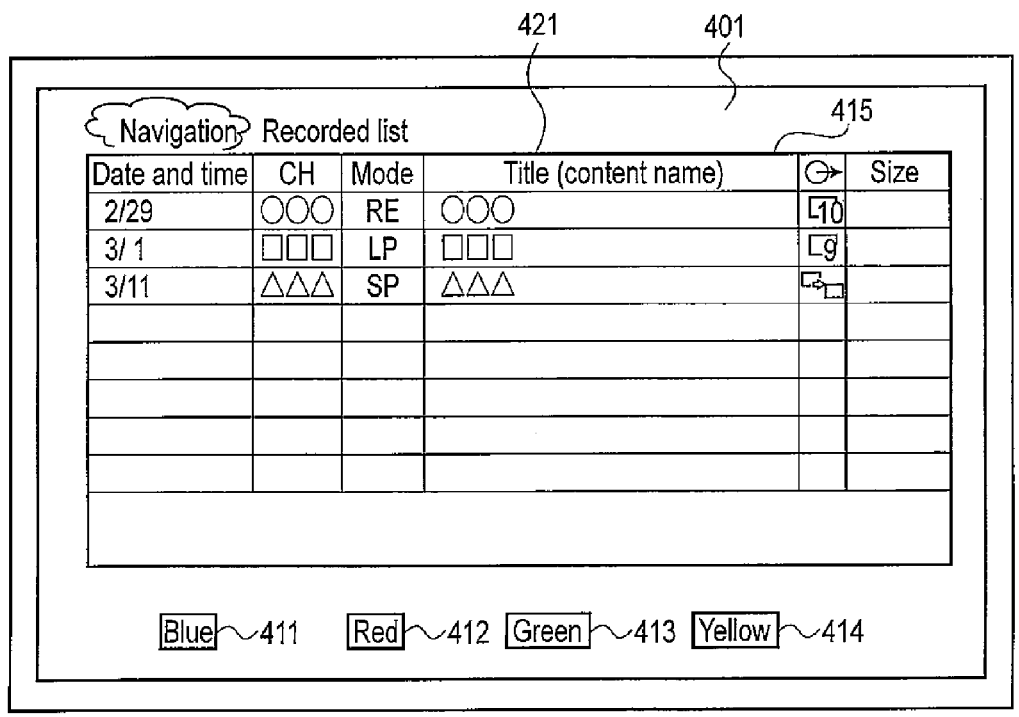

If 'schedule dubbing' is selected and 'schedule dubbing' is started (for example, by turning on the "confirmation" button"), recorded content (programs) held by its own device (recording device B in FIG. 1) are displayed in a list form as a 'recorded list' display 415 as shown in FIG. 4B. For example, if 'schedule dubbing' of a program specified in a display column 421 is instructed (corresponding to [01] of FIG. 3), it is displayed that a supply-side (transmission-side) recording device (recording device C in FIG. 1) connected other than its own device is located in the network system and/or mutual recording system as shown in FIG. 4C. In this case, it is preferable to integrally display a display of 'display recorded list' that receives control input to display the "recorded program list" for the displayed device (corresponding to [02] of FIG. 3).

Next, the date and time on which a program selected as 'schedule dubbing' from its own device, that is, a program specified in the display column 421 in FIG. 4B can be transmitted (supplied) to the recording-side (reception-side) recording device (recording device A in FIG. 1) at the 'schedule dubbing' time is derived for the recording device (recording device C in FIG. 1) displayed to be positioned in the network system and/or mutual recording system in addition to its own device and the thus derived date and time (on which 'schedule dubbing' can be executed) is displayed (refer to FIG. 4D, corresponding to [03] in FIG. 3). On the display 401, it is preferable to display a 'confirmation' display 431 in which an instruction for displaying "confirmation (next screen)" that prompts transfer (display of a next screen) to a next screen (display) can be input. Further, a control command for 'confirmation' can be allocated to any one of the four buttons of the remote control device and it can be prompted to turn on the button of the color.

Figure 4E:
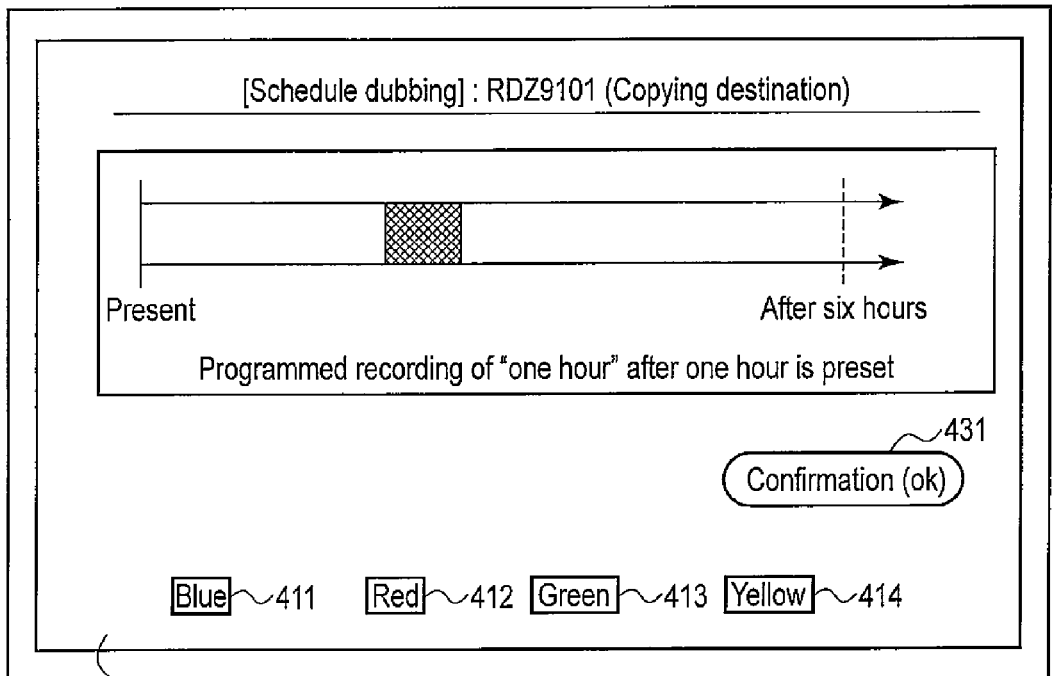

Next, the date and time on which a to-be-copied program (content), that is, a program specified in the display column 421 in FIG. 4B can be received (recorded) by the recording-side (reception-side) recording device (recording device A in FIG. 1) is derived and the thus derived date and time (on which 'schedule dubbing' can be executed) is displayed (refer to FIG. 4E, corresponding to [04] in FIG. 3). On the display 401, it is preferable to display a 'confirmation' display 431 in which an instruction for displaying "confirmation (next screen)" that prompts transfer (display of a next screen) to a next screen (display) can be input. Further, a control command for "confirmation" can be allocated to any one of the four buttons of the remote control device and it can be prompted to turn on the button of the color.

Figure 4F:
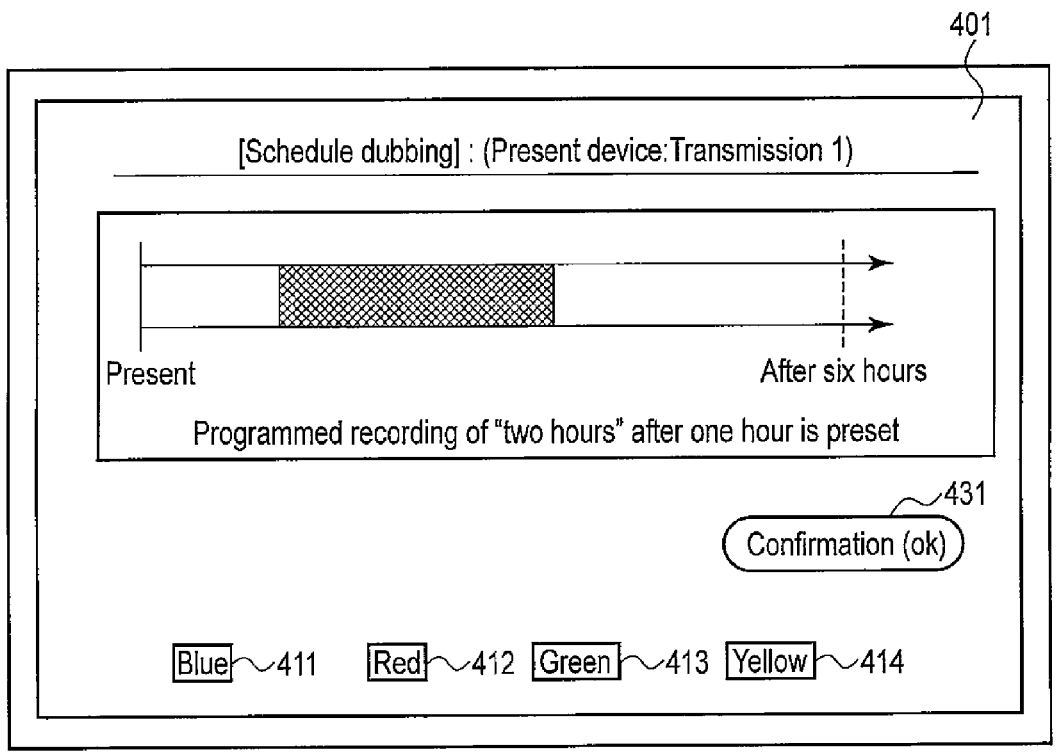

Subsequently, the date and time on which a program can be transmitted (supplied) to the recording-side (reception-side) recording device (recording device A in FIG. 1) is derived on its own device (recording device B in FIG. 1) and the thus derived date (the content item) and time (on which 'schedule dubbing' can be executed) is displayed (refer to FIG. 4F, corresponding to [05] in FIG. 3). On the display 401, it is preferable to display a 'confirmation' display 431 in which an instruction for displaying "confirmation (next screen)" that prompts transfer (display of a next screen) to a next screen (display) can be input. Further, a control command for 'confirmation' can be allocated to any one of the four buttons of the remote control device and it can be prompted to turn on the button of the color.

After this, "time schedule" indicating the date and time (time period) on which a program (content item A) is transmitted from its own device (supply-side [transmission-side] recording device B) and supply-side (transmission-side) recording device C that is located in the network recording system and/or the mutual recording system other than its own device is generated with respect to recording-side (reception-side) recording device A for a program selected as 'schedule dubbing' and the thus generated date and time (on which 'schedule dubbing' can be executed) is displayed as a screen (display) 501 (refer to FIG. 5, corresponding to [06] in FIG. 3). On the display 501, it is preferable to display a 'confirmation' display 531 in which an instruction for displaying "confirmation (next screen)" that prompts transfer (display of a next screen) to a next screen (display) can be input. Further, a control command for 'confirmation' can be allocated to any one of the four buttons of the remote control device and it can be prompted to turn on the button of the color.

Next, a confirmation screen (display) 601 for confirming whether (or not) 'schedule dubbing' is executed according to the displayed "time schedule" is displayed and the aforementioned "time schedule" is supplied (transmitted) to recording-side (reception-side) recording device A and supply-side (transmission-side) recording device C positioned in the network recording system and/or mutual recording system by selecting a 'confirmation', 'execution' or 'YES' display 603 (refer to FIG. 6) that instructs execution (start) (corresponding to [07]/[08] in FIG. 3). If execution is instructed on the aforementioned display 603, a normal "menu screen" is displayed or "return to playback (display) of a program (content) that is now played back by means of a 'return' button" is displayed as a display of the display unit.

Then, 'schedule dubbing' according to the generated "time schedule" is started from the set time.

For example, one or more given displays may be omitted or a different display example may be added until "time schedule" shown in FIG. 5 is displayed after a to-be-copied program (content) is selected in the screen display shown in FIG. 4B. Further, copying (dubbing) is executed on the background until to create the "time schedule" and to display the "time schedule" shown in FIG. 5, for example, is displayed after a to-be-copied program (content) is selected in the screen display shown in FIG. 4B, the generated "time schedule" is displayed and it is preferable to make a set (change) on the set (menu) screen, for example, so as to permit the user to confirm the presence or absence of execution (executed or not).

As described above, when the user copies to-be-copied content item A in the storage area *21 of recording-side (reception-side) recording device A by applying the "time schedule" derived in FIG. 3 to the system shown in FIG. 1, a) whether another device that stores to-be-copied content item A in the network/mutual recording system is present other than recording device B (its own device) is retrieved by operating supply-side (transmission-side) recording device B, b) a time in which recording-side recording device A can perform the recording operation of content item A is derived when it is retrieved that a recording device that holds the same content item A is present other than (its own device), c) a time required for copying can be made minimum by supplying content item A from one of its own device (recording device B in FIG. 1) and another recording device (recording device C in FIG. 1) in a time in which recording-side recording device A can record content item A.

Since transmission (transfer) of content item A to recording device A can be performed except a period in which recording device A executes programmed recording set in its own device, a time required for copying content item A can be set to the least sufficient time.

FIG. 7 shows an example in a case where the recording device operated by the user is a recording-side recording device.

The user selects one or more to-be-copied content items on the GUI screen or the like by means of the recording-side recording device (recording device A in FIG. 1) [11].

The number of recording devices that hold (store) the same content (file) as the content to be copied in the network/mutual recording system (supply-side [transmission-side] recording device B and recording device C other than its own device, that is, recording-side recording device A in the example of FIG. 1) is retrieved by causing the user to select the object content [12].

Next, time information that can be used for performing a content transmission process is acquired from all of the recording devices detected in [12] [13].

Then, time information that can be used for performing the content reception process is generated in its own device, that is, recording-side recording device (A) [14].

After this, a "time schedule" for executing copying is generated based on time information that permits its own device and all of the derived recording devices on the supply (transmission) side to transmit and receive content for copying (dubbing) [15].

Subsequently, the "time schedule" generated in [15] is notified to all of the recording devices detected in the [12] [16].

As described above, a common schedule is set in all of the recording devices in the network/mutual recording system related to execution of copying (dubbing).

A GUI display example of a display (a display unit when the monitor device/recording device is a television receiver) that displays video image output of the recording-side (reception-side) recording device explained in FIG. 7 is shown in FIGS. 8A to 8F, FIG. 9 and FIG. 10. If the recording device is a recorder device or HDD device, it becomes an output video signal that can be displayed by a monitor device (display) connected for video image output.

Figure 8A:
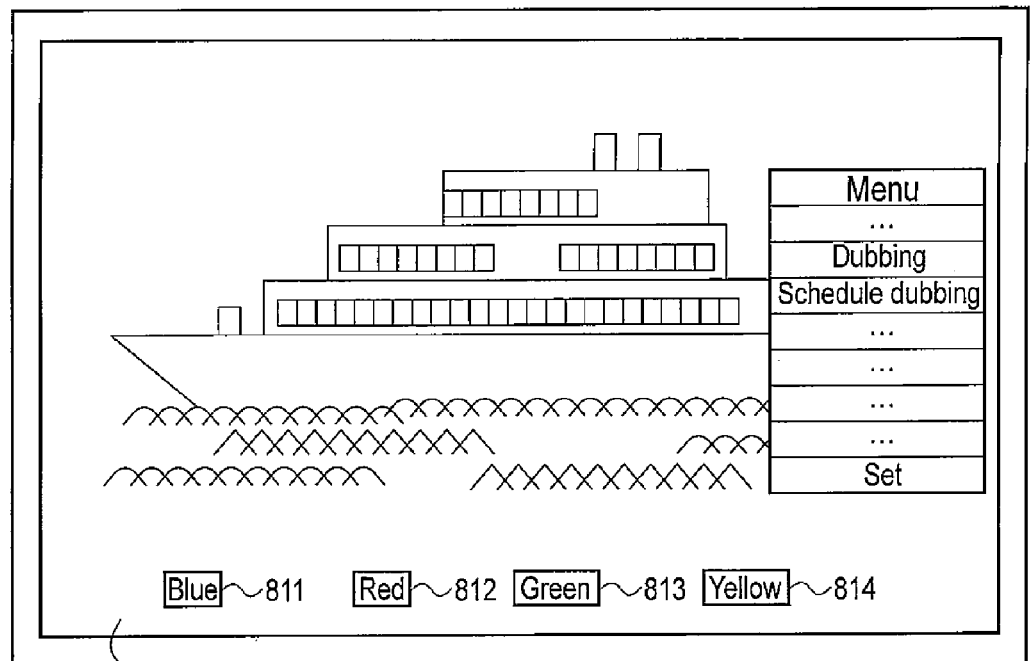
FIGS. 8A, 8B, 8C, 8D, 8E and 8F are exemplary diagrams, each showing, an example of a recording method and showing screen displays when recording is controlled on the reception side, according to an embodiment.

The user operates a remote control device (remote control terminal) and, for example, displays a "menu screen" 801 (FIG. 8A).

The "menu screen" 801 displays a plurality of menus that receive selection and/or decision instructions from the remote control device. If the recording device corresponds to terrestrial digital broadcasting, the "menu screen" 801 can receive instructions corresponding to four buttons including a "blue" button 811, "red" button 812, "green" button 813 and "yellow" button 814 of the remote control device and can give an exclusive processing name for acquiring a "time schedule" for the aforementioned copying as an instruction corresponding to any one of the buttons (refer to FIG. 9, it is hereinafter explained by use of an exclusive processing name of 'schedule dubbing').

Figure 8B:
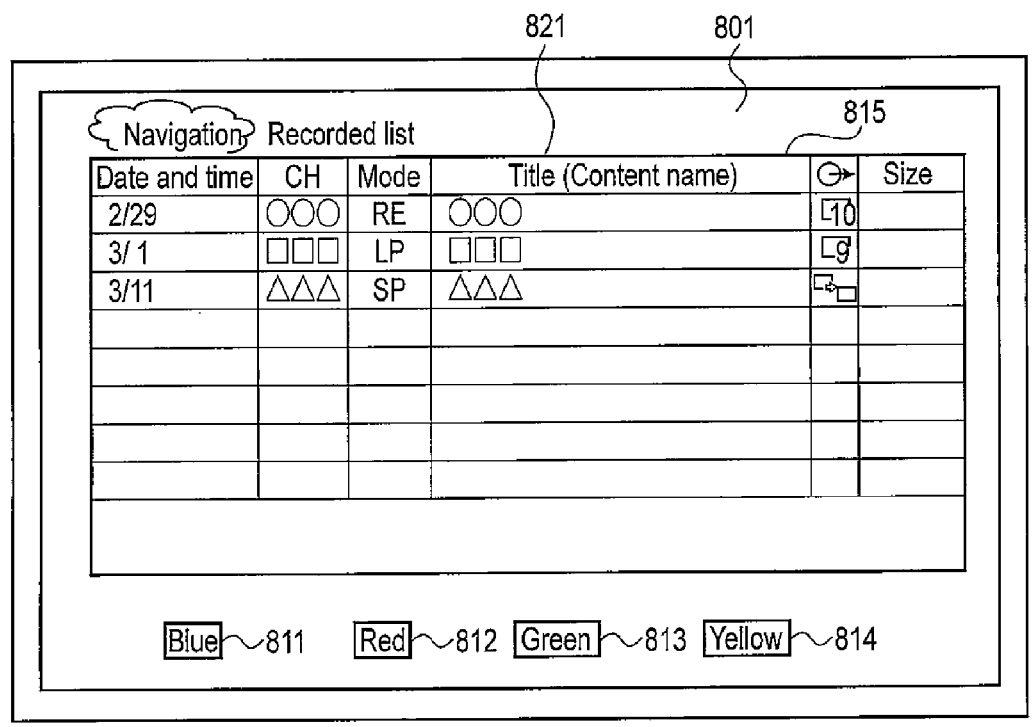

If 'schedule dubbing' is selected and 'schedule dubbing' is started (for example, by turning on the "confirmation" button"), recorded content (programs) held by its own device (recording device A in FIG. 1) are displayed in a list form as a 'recorded list' display 815 as shown FIG. 8B.

Figure 8C:
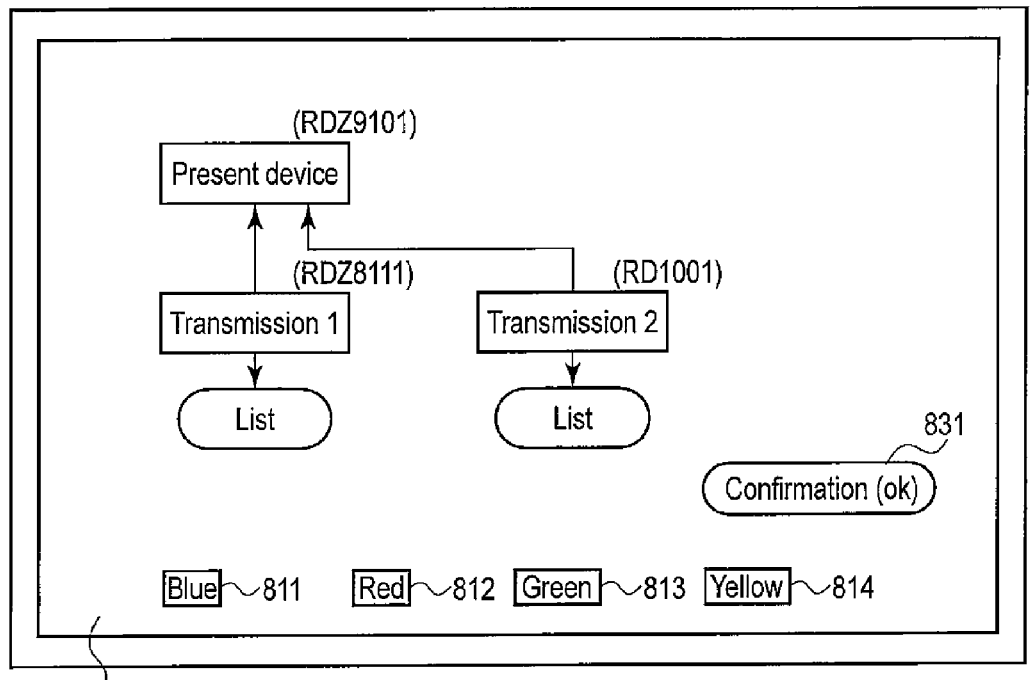

For example, if 'schedule dubbing' of a program specified in a display column 821 is instructed (corresponding to [11] of FIG. 7), it is displayed that a supply-side (transmission-side) recording device (recording device B and recording device C in FIG. 1) connected other than its own device is located in the network/mutual recording system as shown in FIG. 8C (corresponding to [12] of FIG. 7). In this case, it is preferable to integrally display a display of "display a recorded list" that receives control input to display the "recorded program list" on the displayed device.

Figure 8D:
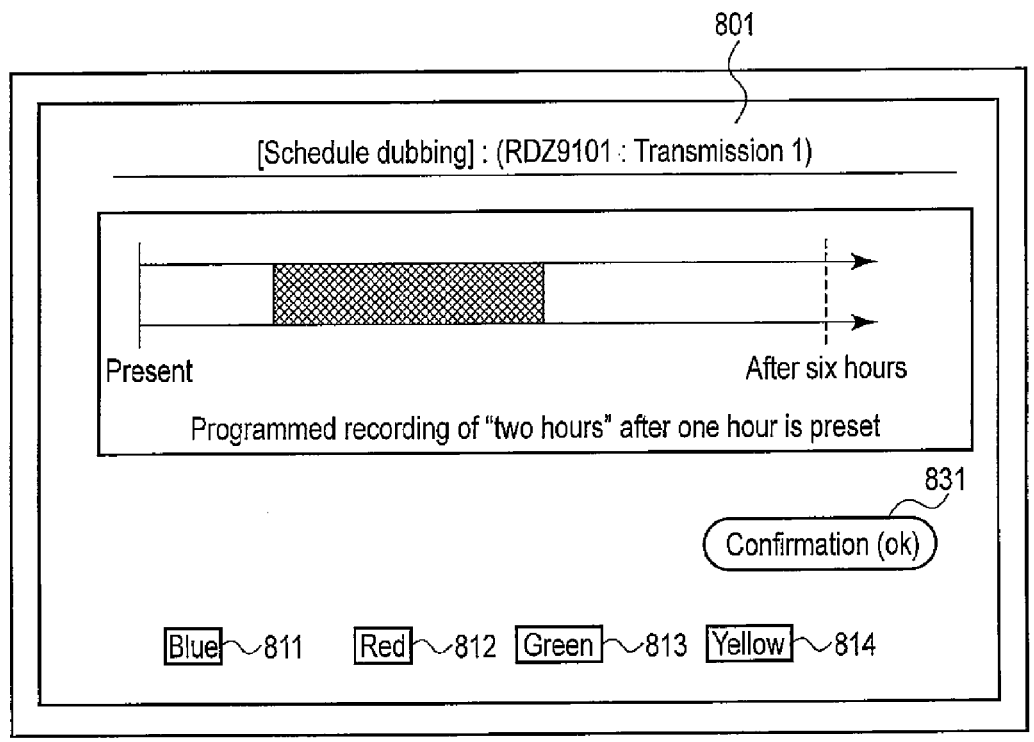
Figure 8E:
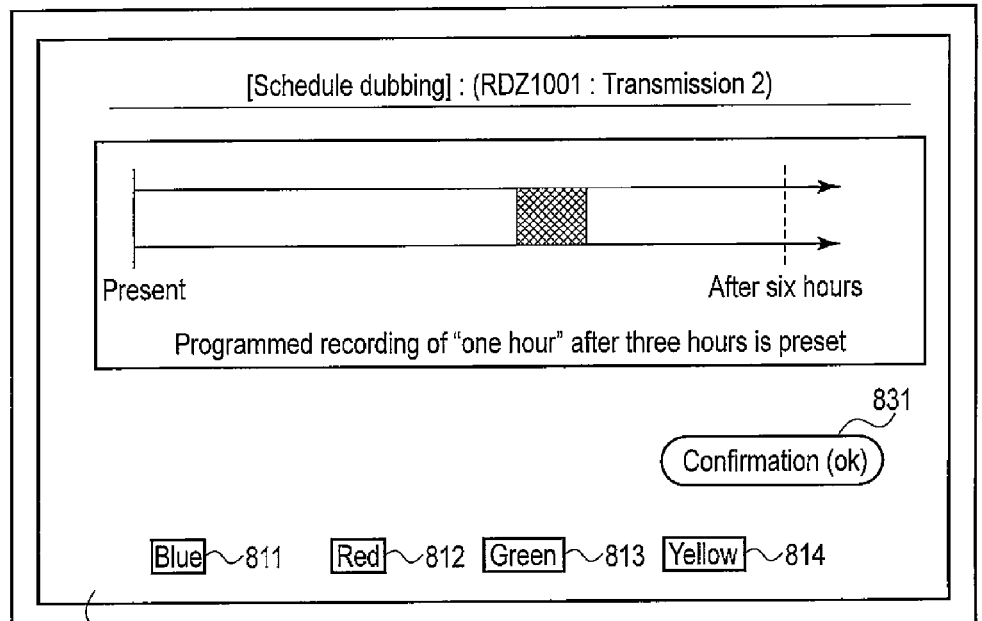

Next, the date and time on which a program selected as 'schedule dubbing' from its own device, that is, a program specified in the display column 821 in FIG. 8B can be transmitted (supplied) to its own device (recording-side (reception-side) recording device A) at the 'schedule dubbing' time is derived for the recording device (recording device B and recording device C) displayed to be positioned in the network recording system and/or mutual recording system in addition to its own device and the thus derived date and time (on which 'schedule dubbing' can be executed) is displayed (refer to FIG. 8D [recording device B], FIG. 8E [recording device C], corresponding to [13] in FIG. 7). On the display 801, it is preferable to display a 'confirmation' display 831 in which an instruction for displaying "confirmation (next screen)" that prompts transfer (display of a next screen) to a next screen (display) can be input. Further, a control command for 'confirmation' can be allocated to any one of the four buttons of the remote control device and it can be prompted to turn on the button of the color.

Figure 8F:
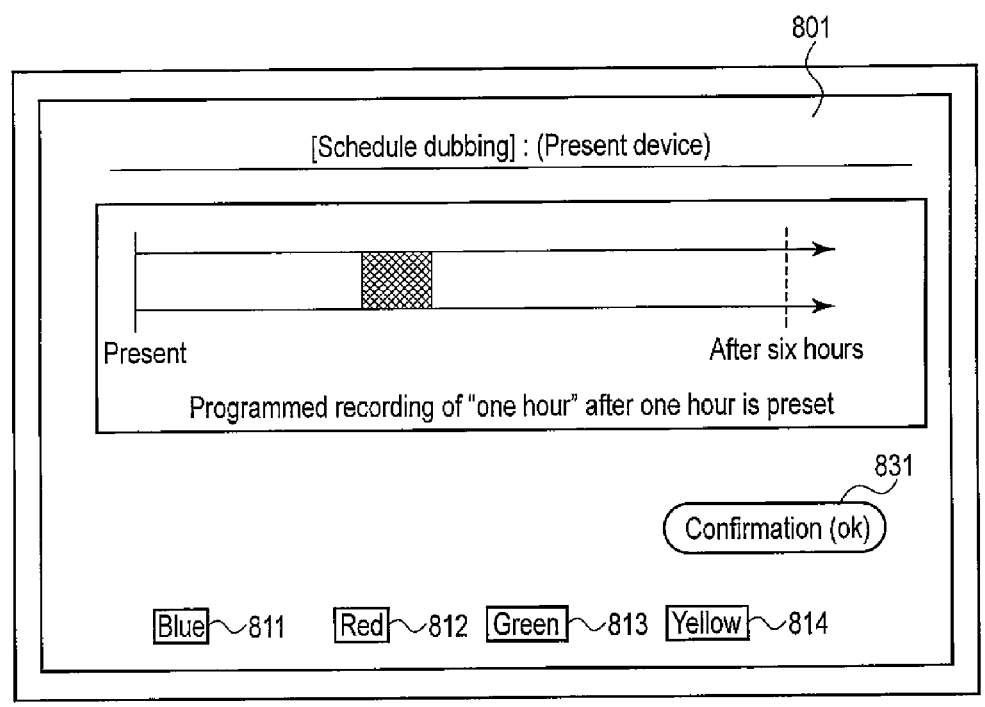

Next, the date and time on which a to-be-copied program (content), that is, a program specified in the display column 821 in FIG. 8B can be received (recorded) by its own device (recording device A) is derived and the thus derived date and time (on which 'schedule dubbing' can be executed) is displayed (refer to FIG. 8F, corresponding to [14] in FIG. 7). On the display 801, it is preferable to display the "confirmation" display 831 in which an instruction for displaying "confirmation (next screen)" that prompts transfer (display of a next screen) to a next screen (display) can be input. Further, a control command for 'confirmation' can be allocated to any one of the four buttons of the remote control device and it can be prompted to turn on the button of the color.

Figure 9:
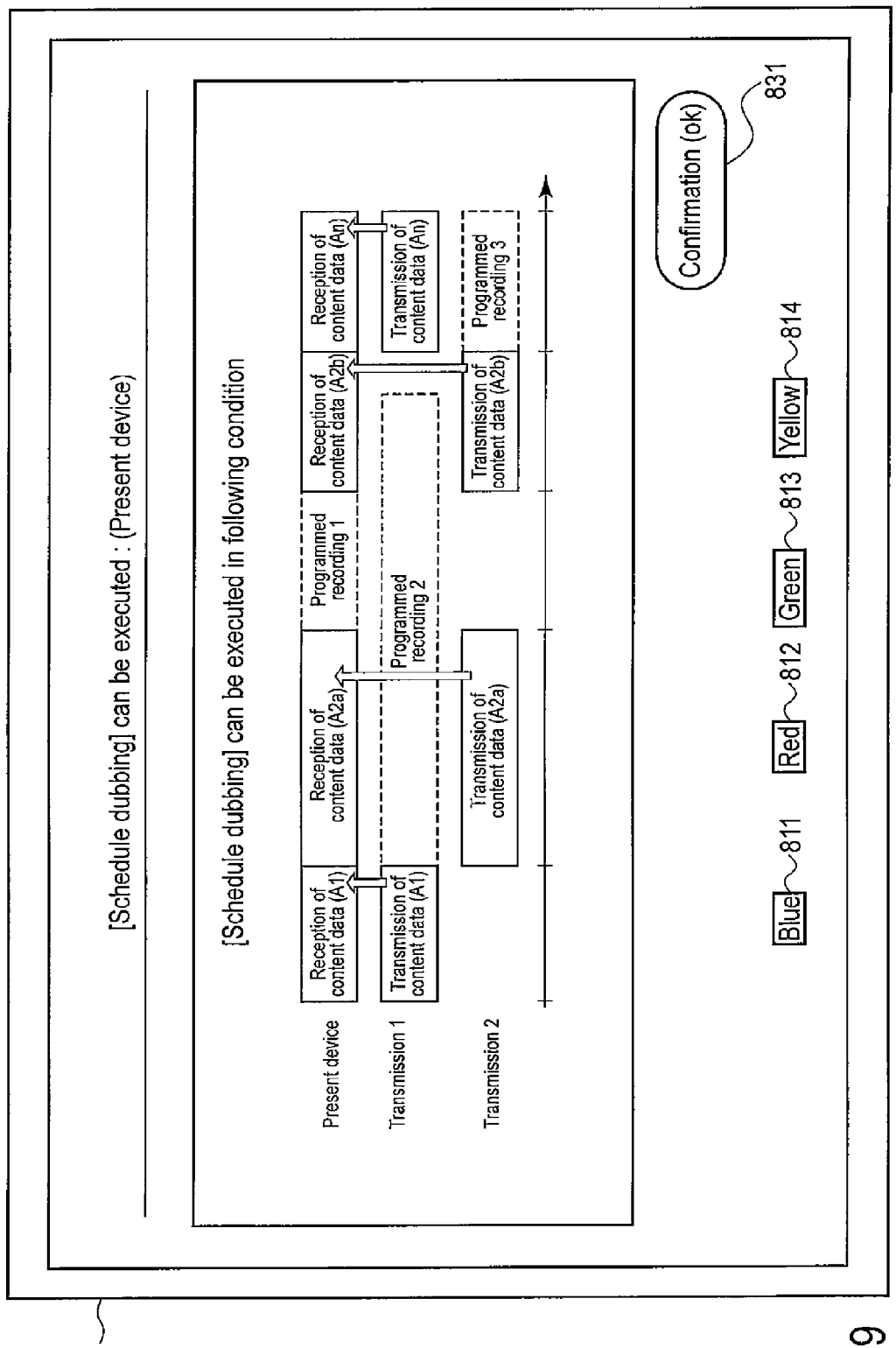
FIG. 9 is an exemplary diagram showing an example of a recording method and showing a screen display when recording is controlled on the reception side, according to an embodiment.

After this, a "time schedule" indicating the date and time (on which 'schedule dubbing' can be executed) is generated based on the derived date and time on which reception (recording) by its own device (recording device A) can be performed and the date and time on which supply (transmission) from respective transmission-side (supply-side) recording devices B and C can be performed and the "time schedule" based on which 'schedule dubbing' corresponding to the generated "time schedule" can be executed is notified to the individual recording devices and the data and time thereof is displayed as a screen (display) 901 (refer to FIG. 9, corresponding to [15], [16] in FIG. 7). On the display 901, it is preferable to display a "confirmation" display 931 in which an instruction for display of "confirmation (next screen)" that prompts transfer (display of a next screen) to a next screen (display) can be input. Further, a control command for 'confirmation' can be allocated to any one of the four buttons of the remote control device and it can be prompted to turn on the button of the color.

Next, a confirmation screen (display) 1001 for confirming whether (or not) 'schedule dubbing' is executed according to the displayed "time schedule" is displayed and 'schedule dubbing' is started according to the aforementioned "time schedule" from the set time from supply-side (transmission-side) recording device B and recording device C positioned in the network recording system and/or mutual recording system by selecting a 'confirmation', 'execution' or 'YES' display 1003 (refer to FIG. 10) that instructs execution (start). If execution is instructed on the aforementioned display 1003, a normal "menu screen" is displayed or "return to playback (display) of a program (content) that is now played back by means of a 'return' button" is displayed as display of the display unit.

After a to-be-copied program (content) is selected on the screen display shown in FIG. 8B, for example, copying is executed on the background until to create the "time schedule" and to display the "time schedule" shown in FIG. 9 is displayed, the generated "time schedule" is displayed for the user and it is preferable to make a set (change) on the set (menu) screen, for example, so as to permit the user to confirm the presence or absence of execution (executed or not).

As described above, when the user copies to-be-copied content item A in the storage area *21 of recording-side (reception-side) recording device A by applying the "time schedule" derived in FIG. 7 to the system shown in FIG. 1, A) whether or not a recording device that holds to-be-copied content item A is positioned in the network/mutual recording system is retrieved by operating recording-side (reception-side) recording device A, B) a time in which a device can transmit (supply) content item A is derived if it can be retrieved that a recording device that holds the same content item A is present in addition to (its own device), C) a time required for copying can be made minimum by supplying (transmitting) content item A from one of other recording devices that are positioned in the network/mutual recording system in a time in which its own device can record (receive) content item A.

Since copying (dubbing) can be executed except a period in which programmed recording set in recording device A (its own device) is executed by transmitting (transferring) content item A to recording device A (its own device) from one of other recording devices that are positioned in the network/mutual recording system, a time required for copying content item A can be set to the least sufficient time.

FIG. 11 shows an example in which the resume function (for checking whether both are the same content and the content items before and after division are a series of content when a portion at which copying (dubbing) at the dividing time is interrupted is supplied again to the recording-side device) with respect to data of content item A that are interrupted to be copied (dubbed) in the copying process shown in FIG. 2A is executed. FIG. 11 corresponds to a copying instruction from the content transmission side explained in FIG. 3. Further, in the following explanation, it is supposed that two recording devices including a recording-side (reception-side) recording device and supply-side (transmission-side) recording device shown in FIG. 1 are provided.

When the aforementioned 'schedule dubbing' is instructed according to the procedure shown in FIG. 3, its own device (content transmission side), that is, recording device B determines whether or not it is the content transmission start time of the time schedule for copying [21].

If the transmission start time is determined [21-YES], a resume point (FIG. 2A, one of t0 to t4) indicating the content transmission start position is acquired from the recording device (recording device A) that receives (records) content [22].

The recording device (its own device, that is, recording device B) that is on the content transmission side starts content transmission according to the resume point (FIG. 2A, one of t0 to t5) acquired from the recording device (recording device B) that receives content [23].

If the transmission start time is not determined [21-NO], whether or not it is the content transmission stop time of the time schedule for copying (dubbing) is determined [24]. If it is the transmission stop time [24-YES], content transmission is stopped [25]. If content transmission is stopped [25], whether or not it is the copying completion time is determined [26].

If the copying (dubbing) completion time (FIG. 2A, t5) is determined [26-YES], a copy control process for object content is performed since copying of the content is completed [27].

If it is not the transmission stop time [24—NO], a content transmission process is continuously performed since it is the time to continuously perform transmission of the content in the time schedule [28].

The copy control process will be explained in detail later.

FIG. 12 shows an example of a resume function for data of content item A interrupted to be copied in the copying process shown in FIG. 2A. FIG. 12 corresponds to a copying instruction from the content reception (recording) side explained in FIG. 7. Further, in the following explanation, it is supposed that two recording devices including a recording-side (reception-side) recording device and supply-side (transmission-side) recording device shown in FIG. 1 are provided.

When the aforementioned 'schedule copying' is instructed according to the procedure shown in FIG. 7, its own device (recording-side (reception-side) recording device A) determines whether or not it is the reception start time in the time schedule for copying [31].

If the reception start time is determined [31-YES], a resume point indicating the position of content transmission is notified to recording device B (or C) that transmits content [32].

Next, content reception is started according to the notified resume point [33].

If the reception start time is not determined [31—NO], the resume point is held and whether or not it is the content reception stop time in the time schedule for copying (dubbing) is determined [34].

If the reception stop time is determined [34-YES], reception of content is stopped [35]. If reception of content is stopped (interrupted) [35], whether or not it is the copying (dubbing) completion time is determined [36].

If the copying (dubbing) completion time is determined [36-YES], whether or not reception of all of the content data is completed is determined. If reception of all of the content data is completed, the reception process is terminated and a copy control process for object content is performed [37].

If the reception stop time is not determined [34-N0], a content reception process is continuously performed since it is the time to continuously perform the content reception process in the time schedule for copying (dubbing) [38].

Figure 13:
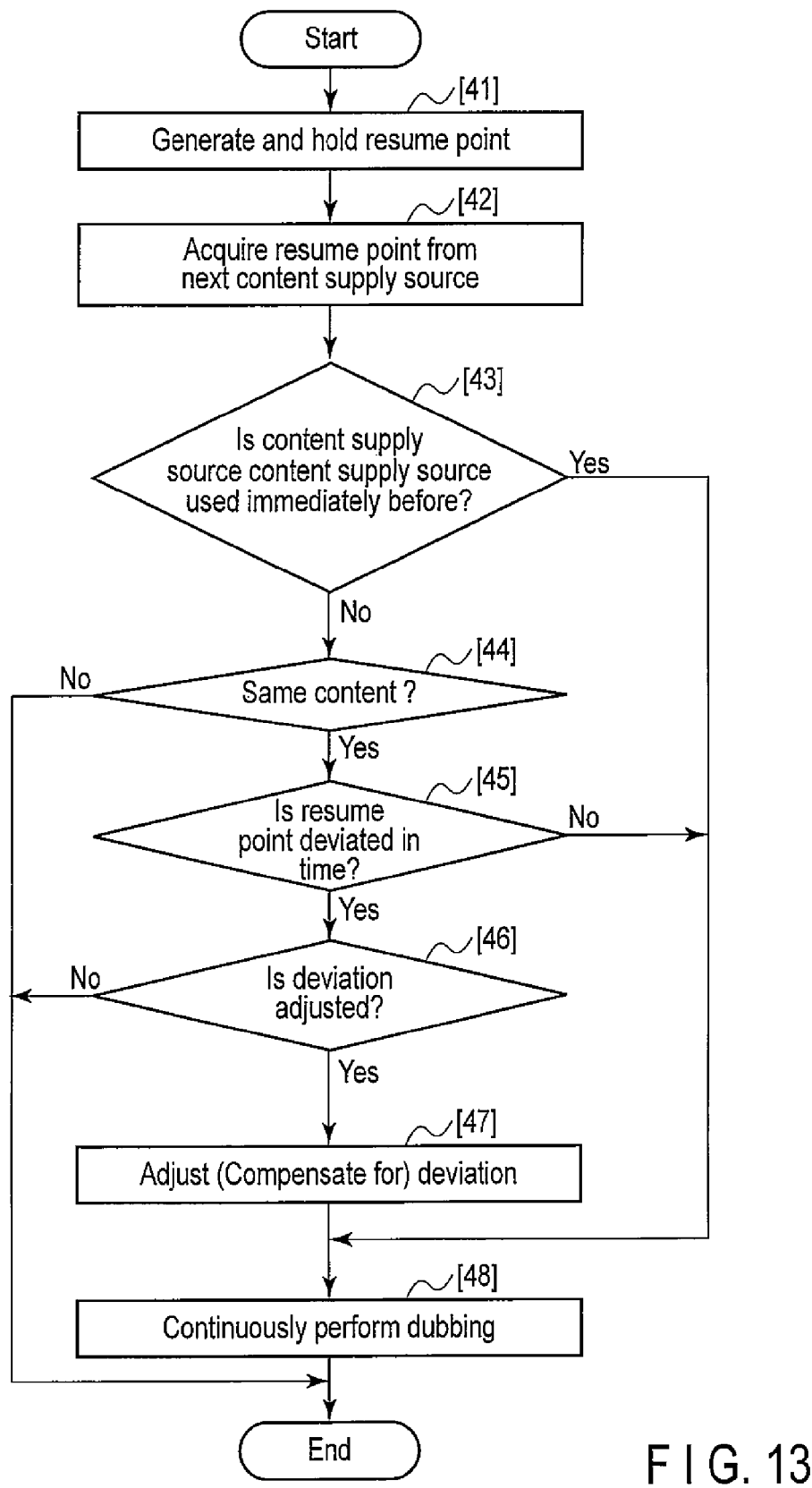
FIG. 13 is an exemplary diagram showing an example of a recording method and showing a method of comparison of dividing positions of divided content with content before division of content divided based on the resume function, according to an embodiment.

A case wherein content items before and after the resume point are the same content and the content items before division and after division are a series of content free from overlapping or loss to continuously execute copying that follows the resume point with respect to the copying temporarily interrupted is explained with reference to FIG. 13. Comparison of content in the resume point is substantially the same as that when the recording devices holding the same content shown in FIG. 3 and FIG. 7 are detected. That is, when content that follows a portion at which copying is interrupted is supplied again to the recording-side (reception-side) recording device, the fact that both are the same content and the content items before and after division are a series of content is advantageous in preventing overlapping portions from occurring in the content to be recorded (received) (it is not indispensable, but the chance of giving a disconcerting effect caused by overlapping or the like to the user who views the content when the copied content is played back in the recording-side (reception-side) recording device (recording device A of FIG. 1) is reduced).

If the copying (dubbing) interruption time is reached while the copying process is performed according to the aforementioned "time schedule", a resume point is formed and held for the content at this time. The resume point includes at least "recording date and time", "time information at the dividing time", "title (content name)" and the like. Further, for example, if the content is supplied as a television broadcasting signal, highly precise comparison can be made by using "electronic program guide (EPG) information" [41].

A resume point is acquired from a recording device that subsequently supplies (transmits) content prior to start of next recording (dubbing) according to the "time schedule" [42].

Next, it is confirmed that the recording device of a content supply (transmission) source accompanied by the acquired resume point is a recording device that has supplied the content up to the present time [43].

If the device that has supplied the content before interruption and the device that supplies (continuous) content after interruption are the same [43-YES], copying of content is continuously performed. In this case, the fact that the content supply source, that is the device that has supplied the content before interruption and the device that supplies (continuous) content after interruption are the same can be easily confirmed by, for example, referring to a media access control (MAC) address in a device having a function mutually or mainly as a server in the network/mutual recording system. Further, for example, if the supply source of content item A used as a basis of block data is a digital camera (still (still picture)) or digital video camera, it can be easily confirmed by referring to the "folder structure defined based on "DCF (or Exif)"/""maker name" belonging to (DCF)"/"type (model) name"" attached to individual content.

If the device that supplies the content before interruption and the device that supplies (continuous) content after interruption are not the same [43-N0], the resume point of holding content is referred to and it is confirmed that the content before interruption and the content to be continuously supplied are the same. The fact that the content before interruption and the content to be continuously supplied are the same can be confirmed by referring to content inherent to the date and time, ch (channel), broadcasting station (distribution company) name and the like provided (by the first content supply source, for example, broadcasting station or distribution company) for the respective content by, for example, using attribute data belonging to the respective content, the aforementioned EPG information, time information prepared as one of service information (SI) including EPG information and program map table (PMT) of an elementary stream (ES) contained in SI or playback time information contained in pack_header provided in a pack formed by connecting a preset number of PES packets each of which is obtained by forming ES in a packet form or the like. Further, if the same resume point is not previously prepared in object content (particularly, successively supplied content), it can be determined that the content is substantially the same content by detecting that information that coincides with one of the aforementioned various information items contained in the content interrupted to be copied in the content (held by the recording device that next supplies (transmits) content) [45].

If it can be determined that the content before interruption and content successively supplied are the same [45-YES], it is detected that there is no time deviation between the mutual content [46].

If no time deviation occurs between the mutual content [46-YES], copying of content is continuously performed [44].

If time deviation occurs between the mutual content [46-N0], it is detected that the deviation can be adjusted according to a cause of the deviation [47-YES], time (time information) at which successively supplied content is transmitted (content is supplied following the interrupted content) is set (adjusted) [48], and copying of content is continuously performed. For example, the time (time information) at which successively supplied content is transmitted (content is supplied following the interrupted content) can be easily acquired by referring to "elapse time from the head of the content", "time belonging when the content is first supplied" or the like [44].

Further, if time deviation occurs between the mutual content [46—NO] and it is difficult to adjust the deviation, that is, the aforementioned time information items do not coincide or the coincident ranges are greatly different or the like, it is preferable to interrupt copying and display (output display output) an alert (message) of, for example, 'the same content cannot be detected'. This is true if it cannot be confirmed that the content before interruption and successively supplied content is the same [45-M0].

FIGS. 14A, 14B and 14C each show an example of coincidence of time when the total times (time lengths) do not coincide even though no time deviation occurs between the mutual content.

It can be considered that individual sections are set based on an already practiced "video image structuring" method (FIG. 15) and "given section detection" method (FIG. 16) for a "CM (commercial)" section included in the original version of the content (program) if it can be predicted that a non-coincident portion corresponds to a CM (commercial) portion, for example, when the content held by the content supply source are content item A' (FIG. 14B) and content item A (FIG. 14A) whose total times are different although attribute data belonging to respective block data items, EPG information or SI including EPG information is coincident.

For example, if chapter dividing points that can be represented as c1, c2, . . . , c5 are detected based on a "video image structuring" processing part shown in FIG. 15, dividing information items m1, m2, m3, m4 (silent sections) in a time direction of the same program (content) are detected based on a "given section detection" processing part shown in FIG. 16 and, for example, sections between m1 and m2 and between m3 and m4 that are sections in which the sound mode is kept unchanged and continuous or a stereo mode is continuous are set as "given sections", a specified given section can be detected as a CM section.

Therefore, if editing position x1 contained in block data shown in FIG. 14A is a continuing portion between m1 and m2 in content item A' and editing position x2 is a continuing portion between m3 and m4 in content item A', it can be determined that both are the same block data of continuous content.

Further, as shown in FIG. 14C, when content item A includes connecting portions y1, y2, y3, y4, it can be specified that intervals between y1 and y2 and between y3 and y4 are given overlapping sections (so-called "margin") used by block data for editing of content based on time information, that is, m1 included in y1 and m2 included in y2 or m3 included in y3 and m4 included in y4.

Figure 17:
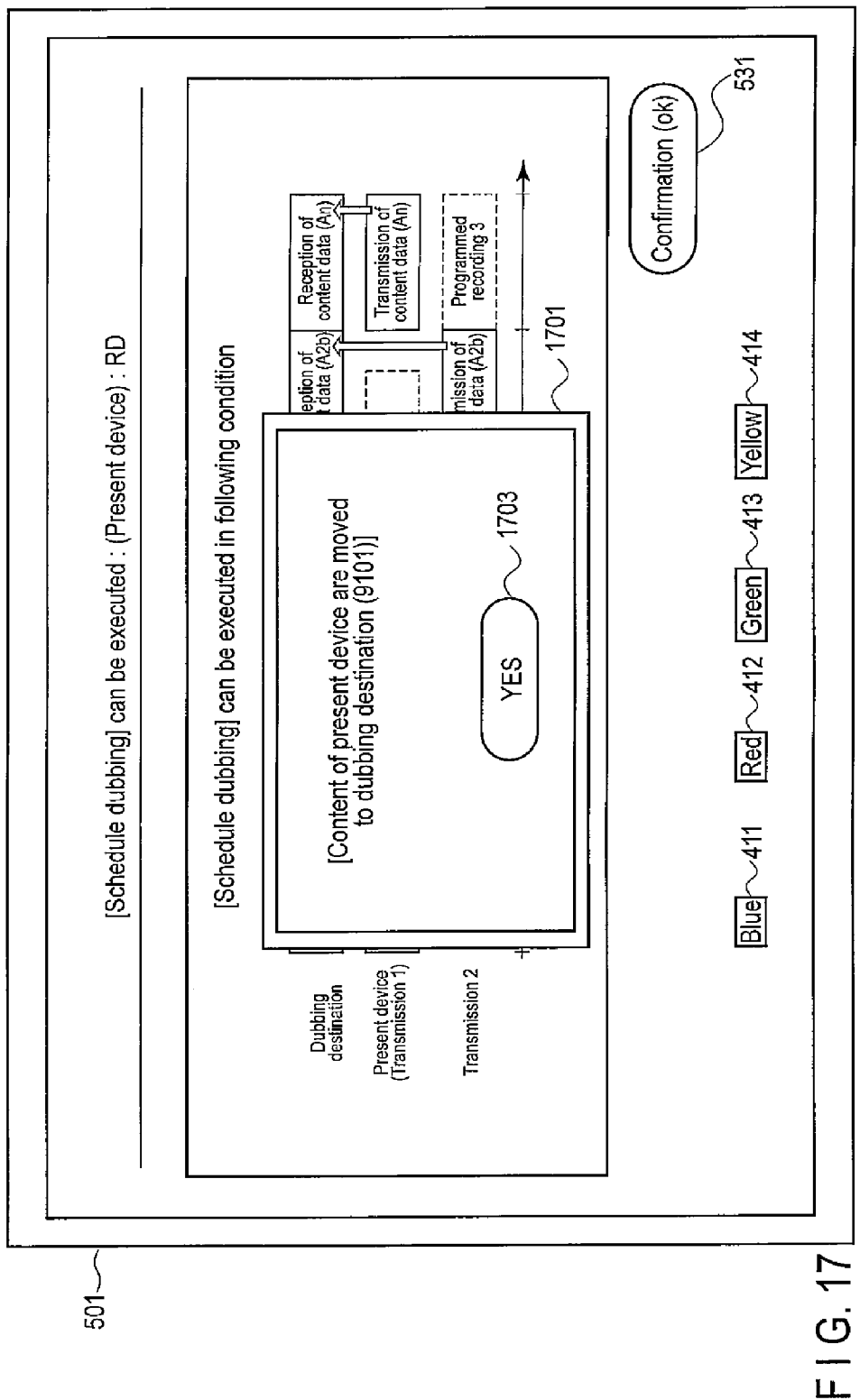
FIG. 17 is an exemplary diagram showing an example of an outline of a "copy control process" in a recording method, according to an embodiment.
Figure 18:
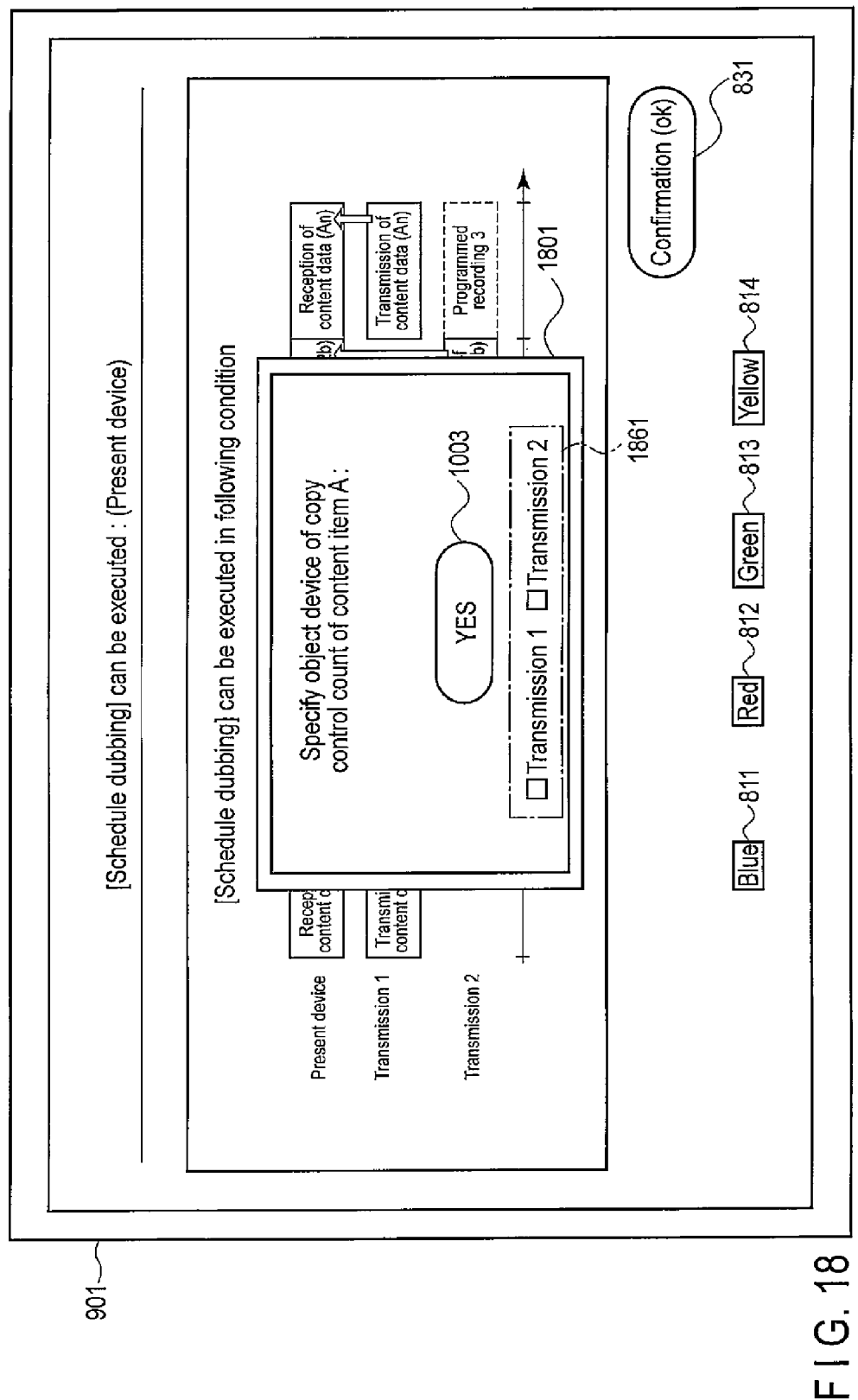
FIG. 18 is an exemplary diagram showing an example of an outline of a "copy control process" in a recording method, according to an embodiment.

FIG. 17 and FIG. 18 each show an example of setting (confirmation) screen display of a "copy control process (copy control)".

Since degradation in digital content (program/information/title) supplied from the broadcasting station (broadcasting company) or distribution company at the copying time is less, "Copy Once" in which copy is substantially inhibited (only a move (moving) is permitted) and (so-called) "Dubbing 10" in which the upper limit of the number of copies is provided, for example, copies of nine times are permitted and $10^{th}$ copying is performed as a move are performed. In the case of a BS system (broadcast provided by Broadcasting Satellite) of the terrestrial digital broadcasting and satellite broadcasting (the sampling frequency is less than 48 kHz), "Dubbing 10" is applied and in the case of a CS system (broadcast relayed by communication satellite) of the satellite broadcasting (the sampling frequency is 48 kHz), "Copy Once" is applied.

Figure 6:
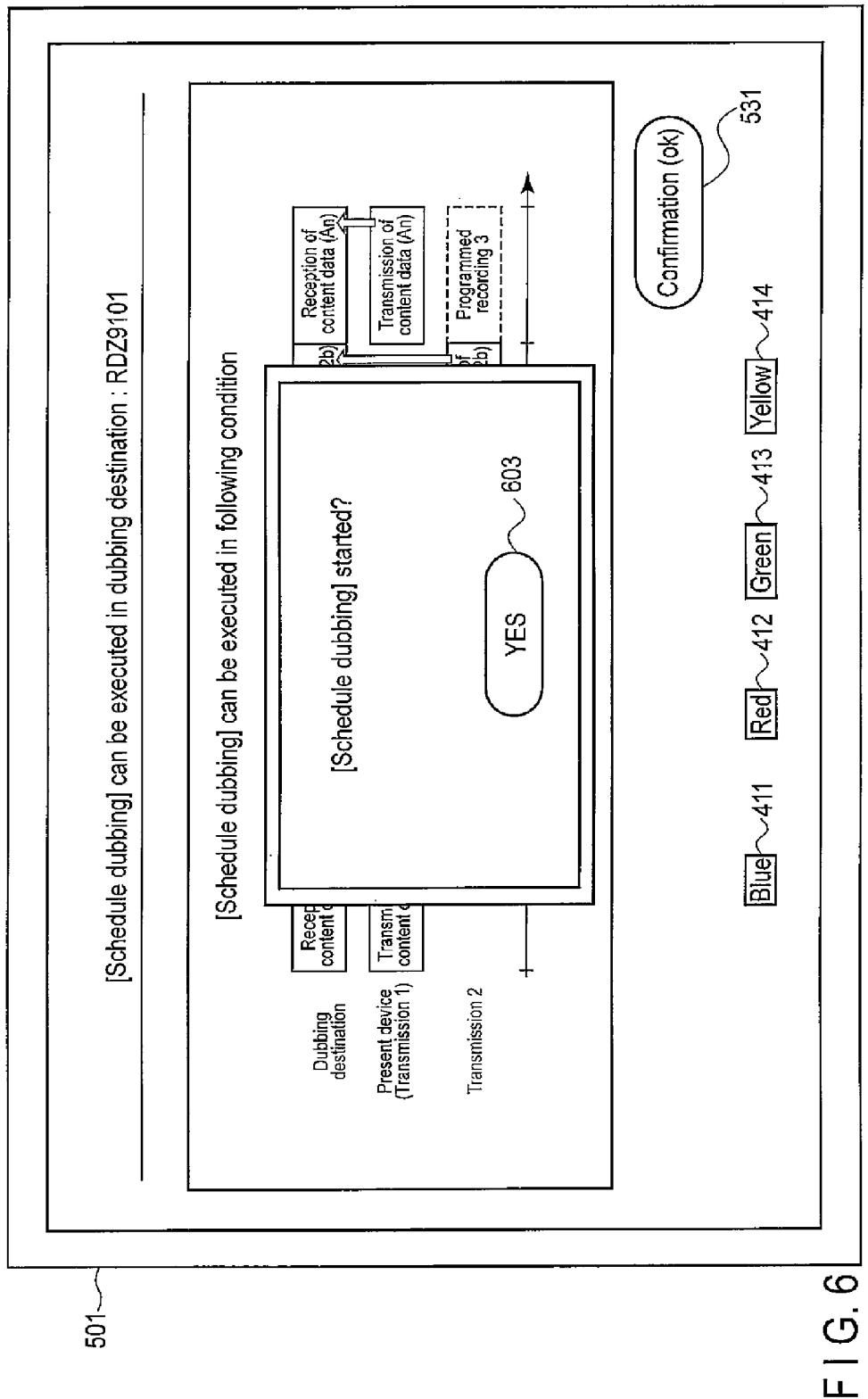
FIG. 6 is an exemplary diagram showing an example of a recording method and showing a screen display when recording is controlled on the transmission side, according to an embodiment.
Figure 10:
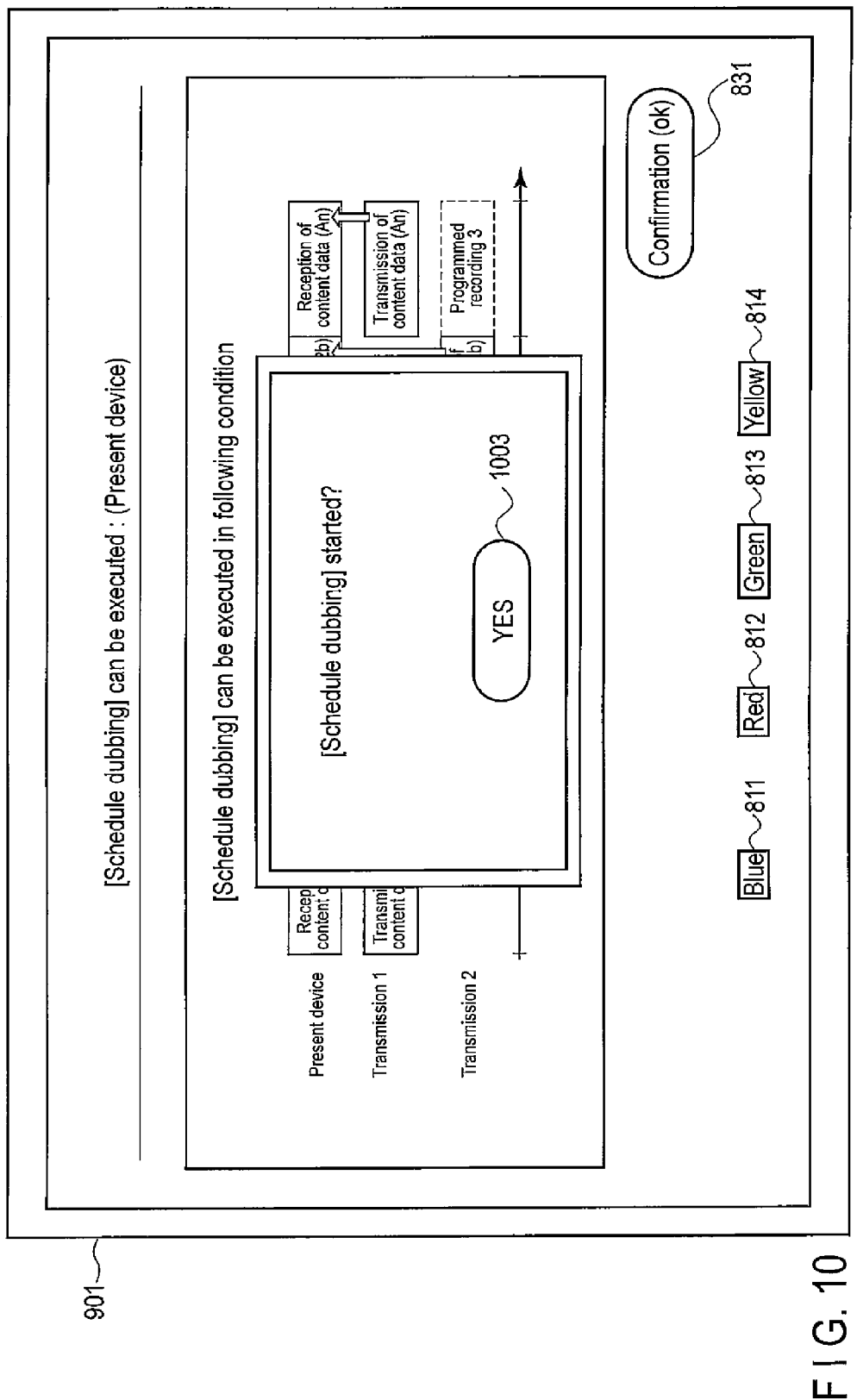
FIG. 10 is an exemplary diagram showing an example of a recording method and showing a screen display when recording is controlled on the reception side, according to an embodiment.

Therefore, confirmation (approval) by the user for the copy control becomes necessary by using GUI or OSD before start of 'schedule copying' explained in FIG. 6 or FIG. 10 is received or immediately after the reception.

In order to make valid content received by the receiving device via the aforementioned dividing movement, that is, parallel transmission (parallel reception), it is necessary to attain confirmation (approval) by the user for content held by the transmission device side with respect to content (content item A obtained by restructuring block data) recorded in the receiving device by applying the copy control process explained in FIG. 6. At the time of confirmation (approval) by the user, as shown in an example in FIG. 17, an alert (message) 1701 of 'content moved to recording device A, in practice, for example, it is preferable to display the 'type name' that can be acquired from a MAC address, 'connection name' in the network/mutual recording system connected via HDMI or the like, from recording device B, for example, it is preferable to display the 'type name' that can be acquired from a MAC address, that finally transmits content' and a 'confirmation', 'execution' or 'YES' display 1703 that prompts for confirmation (approval) thereof for content to which "Copy Once" is applied is displayed by using a graphical user interface (GUI) or on-screen display (OSD).

On the other hand, for the content to which "Dubbing 10" is applied, as shown in an example in FIG. 18, an alert (message) 1801 of 'setting of copy limitation' a 'confirmation', 'execution" or 'YES' display 1803 that urges the confirmation (approval) thereof and an input request display of a setting unit 1861 of, for example, a "check box" type that can select or input a device that executes copy limitation and the like are displayed as shown in an example in FIG. 18 for content to which "Dubbing 10" is applied is displayed in screen 901 of the recording device 101. In practice, the alert (message) 1901 and/or the check box (the setting unit) 1861 and 'confirmation', 'execution" or 'YES' display 1903, it is preferable to display a 'type name' acquired from a MAC address or a 'connection name' in the network/mutual recording system connected via HDMI or the like, is displayed in screen 1801. In FIG. 18, if a device name that executes copy limitation is not input, it is preferable to display an alert (message) 1901 of 'copying of content to which "Dubbing 10" is applied cannot be executed, for example, "terminate" or make a setting (inputting) on a screen returned by use of a "return" button" as shown in an example in FIG. 19 after a preset time, for example, after an elapse time of 15 seconds and terminate the display after a preset time, for example, after an elapse time of 15 seconds.

Figure 19:
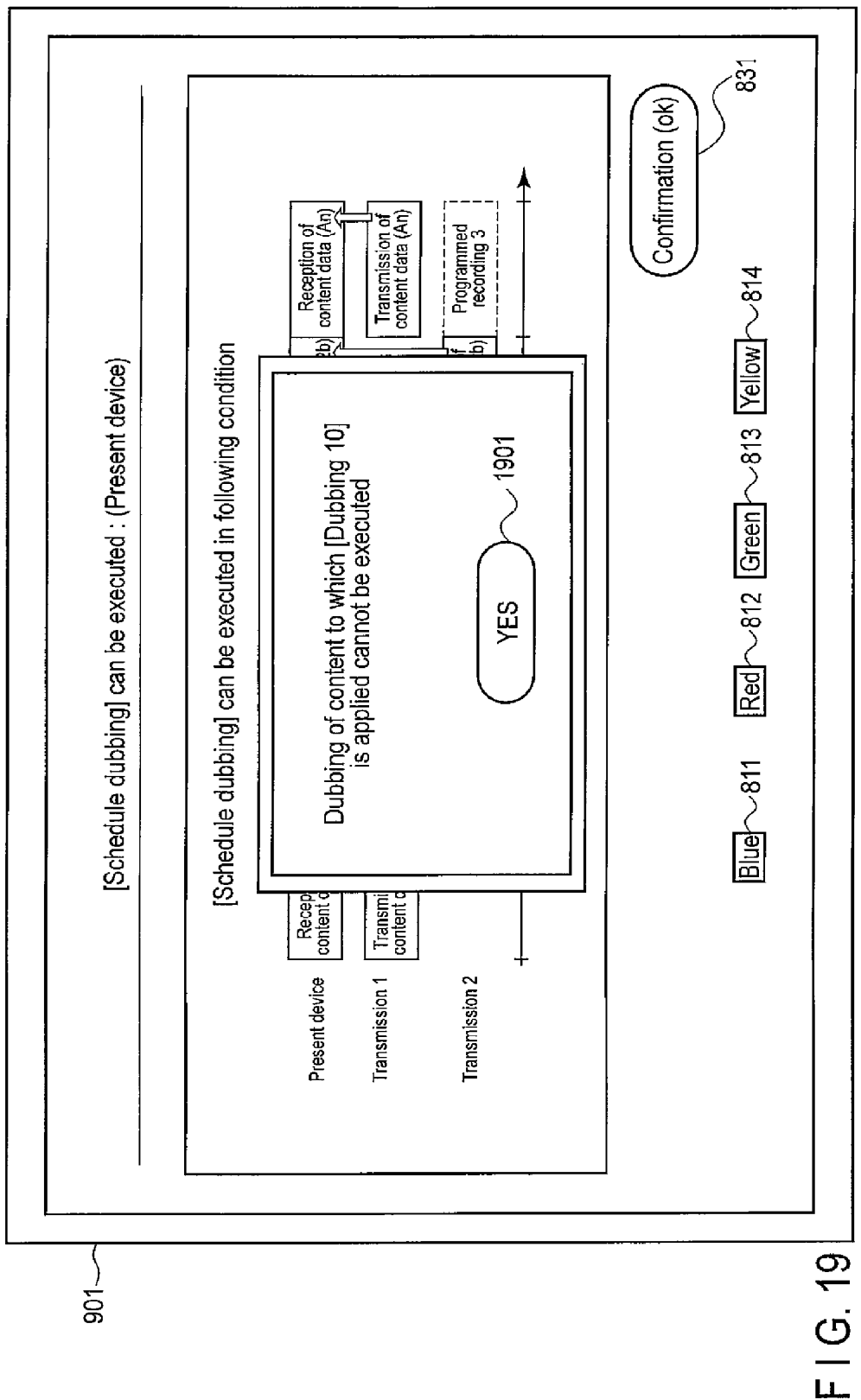
FIG. 19 is an exemplary diagram showing an example of an outline of a "copy control process" in a recording method, according to an embodiment.

When the alerts (messages) shown in FIG. 17, FIG. 18 and FIG. 19 are displayed by use of on-screen display (OSD), the whole portion of a guide screen that indicates a connection between the mutual recording devices is set in a "semitransparent" state by setting α parameter of a blending to a suitable value, for example, as shown in FIG. 20, a part of a normal video signal is made transmissible or a change in density is given thereto by gray-down display or the like is displayed and an alert (message) 2001 and an object recording device whose copy limitation count becomes "−1" by "Dubbing 10" can be emphasized and displayed. Further, a 'confirmation', 'execution" or 'YES' display 2003 that prompts the confirmation (approval) thereof is displayed.

Further, it is also possible to display, for example, 'copy limitation of recording device B <the same 'type name' or 'type name'> that finally transmits content is decremented by a count "1" on recording device A <in practice, it is preferable to display a 'type name' that can be acquired from a MAC address, for example, or a 'connection name' in the network/mutual recording system connected via HDMI or the like> on the alert (message) display shown in FIG. 20 and automatically start copying.

In the "copy control process" explained in FIG. 18 and FIG. 19, the set screen is prepared and, for example, it is possible for the user to select 'copy limitation of a recording device that transmits the final section of content is decremented by a count "1"'/'Pa recording device that decrements the copy limitation count by "1" every time'. Alternatively, after recording-side recording device A receives an operation of selecting a recording device that decrements the copy limitation count by "1" from the user, the recording device may be set as a recording device that transmits the final section of content. That is, after setting the device that decrements the copy limitation count, recording-side recording device A may set schedule copying to receive a final section of content from the device and acquire a copy key from the device after receiving the final section of the content.

Further, a display example can be obtained by freely combining a display method used for the display.

Thus, when programmed copying is set, the copying time can be reduced and copying can be efficiently executed by generating a "time schedule" containing division of content based on the result of detection of time in which a copying (dubbing) process can be performed and executing copying based on the "time schedule" in the recording device that transmits content and the recording device that receives the same.

Further, after to-be-copied content for recording are divided in a given position by using a resume point and it is confirmed that content before division and content after division are the same continuous content, the content can be recorded as continuous content, and when programmed recording is started, the load of the user is reduced since there is no possibility that copying (recording) previously started is discarded (re-copying is required).

In the above explanation, the operation of two or more recording devices that hold to-be-copied content can be realized in various cases wherein, for example, a single content is separately recorded in two or more recording devices, content held by a given recording device are copied into another recording device in a copy control range and content is recorded twice or more when the content is supplied plural times by repetitive broadcasting (re-broadcasting) or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A copying method comprising:
   deriving a first time requested by a process in a first transmission device configured to interrupt transmission to a copying destination device to transmit a copying object to the copying destination device;
   detecting a second transmission device configured to transmit the same copying object to the copying destination device during the process that interrupts the transmission to the copying destination device after an interruption point, and deriving a second time where the detected second transmission device transmits the copying object to the copying destination device;
   deriving a third time where the copying destination device is in a non-reception state for the copying object; and
   setting a transmission condition for transmitting the copying object to the copying destination device according to the first, second, and third times.

2. The copying method of claim 1, wherein a state of the copying object when the transmission to the copying destination device is interrupted is held, and a degree of matching between a state of a copying object successively transmitted at a transmission start time and the held state of the copying object when the transmission is interrupted is determined.

3. The copying method of claim 1, wherein a first transmission source of the copying object when the transmission is interrupted and a second transmission source of a copying object to be successively transmitted are the same.

4. The copying method of claim 1, wherein a first transmission source of the copying object when the transmission is interrupted and a second transmission source of a copying object to be successively transmitted are different.

5. The copying method of claim 1, wherein a first state is confirmed to be substantially the same as a second state of the copying object when the transmission held by information of a to-be-transmitted copying object is interrupted by comparing the first and second states when a copying object to be successively transmitted is transmitted.

6. A copying method comprising:
   holding a copying object to receive the copying object and detecting a first copying object supply source configured to transmit the copying object in a first time according to a transmission request notified by itself;
   detecting a second copying object supply source configured to transmit the copying object in a third time defined based on the first time corresponding to the transmission request notified by itself and a second time notified by the detected second copying object supply source when the detected second copying object supply source notifies the second time where the copying object is in a non-transmission state; and
   setting a reception condition for receiving the copying object from the first copying object supply source and second copying object supply source according to the first, second, and third times.

7. The copying method of claim 6, wherein a state of the copying object when transmission of the copying object to a transmission request source is interrupted is held, and a degree of matching between a state of a copying object successively transmitted at a transmission start time and the held state of the copying object when the transmission is interrupted is determined.

8. The copying method of claim 7, wherein a first transmission source of the copying object when the transmission to the transmission request source is interrupted and a second transmission source of a copying object to be successively transmitted are the same.

9. The copying method of claim 7, wherein a first transmission source of the copying object when the transmission to the transmission request source is interrupted and a second transmission source of a copying object to be successively transmitted are different.

10. The copying method of claim 9, wherein a first state of the copying object when the transmission to the transmission request source is interrupted is confirmed to be substantially the same as a second state of the copying object when the transmission is interrupted by comparing the first and second states when a copying object to be successively transmitted is transmitted.

11. A recording apparatus comprising:
    an input/output unit configured to supply a copying object to a network and acquire a copying object from the network;
    a holding unit configured to hold the copying object;
    a signal processing unit configured to input a copying object acquired by the input/output unit in the holding unit and output the copying object held by the holding unit to cause the input/output unit to output the copying object; and
    an input/output control unit configured to detect that the copying object is freely divided at the input/output time of the copying object by the signal processing unit and input/output unit and a copying object where a dividing point of the divided copying objects is an end and a copying object where the dividing point is a head are accompanied by continuity obtained by dividing the same copying object.

12. The recording apparatus of claim 11, wherein the input/output control unit notifies a time where the copying object is in a non-reception state when the recording device is on the reception side, notifies a time when the copying object is in a non-transmission state when the recording device is on a transmission side and a copying object is divided based on time information of the copying object, notifies a non-reception time, and notifies a non-transmission time.

13. The recording apparatus of claim 12, wherein the input/output control unit freely divides the copying object at the output time of the copying object when the recording device is on the transmission side and a dividing unit configured to provide information indicating that the copying object where the dividing point of the divided copying objects is the end and the copying object where the dividing point is the head are accompanied by the continuity obtained by dividing the same copying object divides content that is copy-controlled according to copy control information into block data without influencing the copy control information.

14. The recording apparatus of claim 12, wherein the input/output control unit divides the copying object output from itself based on the non-reception time of the copying object notified from a recording device that is on a side where the copying object is received when the recording device is on the transmission side.

15. The recording apparatus of claim 14, wherein the input/output control unit divides the copying object output from itself according to a factor that interrupts transmission of the copying object to the recording device that is on a side on which its own copying object is received when the recording device is on the transmission side.

16. The recording apparatus of claim 13, wherein the input/output control unit notifies a time when the copying object is in a non-reception state to the recording device that is on the transmission side and requests division of the copying object when the recording device is on the reception side.

17. The recording apparatus of claim 13, wherein the input/output control unit holds copying objects in a preset sequence according to information indicating continuity obtained by dividing the same copying object held by each of copying objects divided and received when the recording device is on the reception side.

* * * * *